(12) United States Patent
Baba et al.

(10) Patent No.: US 6,385,212 B1
(45) Date of Patent: May 7, 2002

(54) DATA SWITCHING APPARATUS FOR SWITCHING RECEIVED DATA WITHOUT CHANGING CODING UNIT

(75) Inventors: Masayuki Baba; Yoshiaki Kato; Tokumichi Murakami, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/182,882

(22) Filed: Oct. 30, 1998

(30) Foreign Application Priority Data

Nov. 25, 1997 (JP) .............................. 9-322526
Aug. 4, 1998 (JP) .............................. 10-220083

(51) Int. Cl.$^7$ .............................. H04J 3/07; H04J 3/02
(52) U.S. Cl. ...................... 370/506; 370/537
(58) Field of Search .............................. 370/493, 431, 370/437, 438, 442, 458, 498, 503.6, 535, 537, 538, 540, 545; 348/423.1

(56) References Cited

U.S. PATENT DOCUMENTS 5,696,557 A    12/1997   Yamashita et al.

FOREIGN PATENT DOCUMENTS

| EP | 590974 | 4/1994 |
|----|--------|--------|
| EP | 755157 | 1/1997 |
| EP | 802691 | 10/1997 |
| EP | 805601 | 11/1997 |
| EP | 387609 | 4/1998 |
| JP | WO96005697 | 2/1996 |

OTHER PUBLICATIONS

ISO/IEC, 13818–1: 1994E, ITU–T Rec. H.222.0 (1995 E) pp. 158–161.

"Splice Points for MPEG–2 Transport Streams", SMPTE Journal, SMPTE, Inc. Scarsdale, NY, vol. 107, No. 10, Oct. 1998, pp. 916–925.

*Primary Examiner*—David R. Vincent

(57) ABSTRACT

A data switching apparatus selects and transmits one of a plurality of received data and switches coded data while holding a coding unit of the coded data. A data switching apparatus includes plural data unit detectors each for detecting a coding unit of a data from a received data; plural data storages each for storing a received data in a buffer and transmitting the received data at a given time from a point specified by the data unit detector; and a data selecting unit for selecting and transmitting only one data stream from a plurality of data streams which are transmitted respectively from the plural data storages.

28 Claims, 16 Drawing Sheets

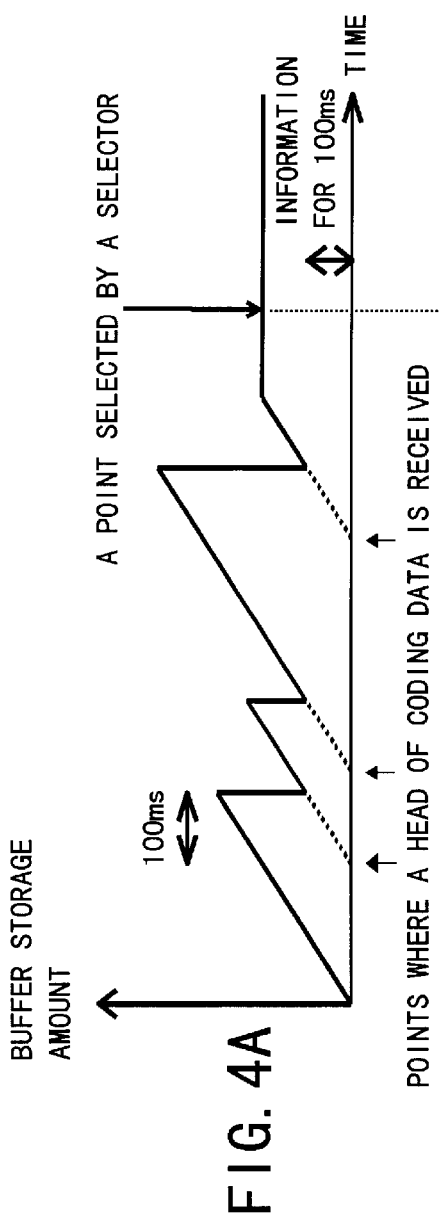
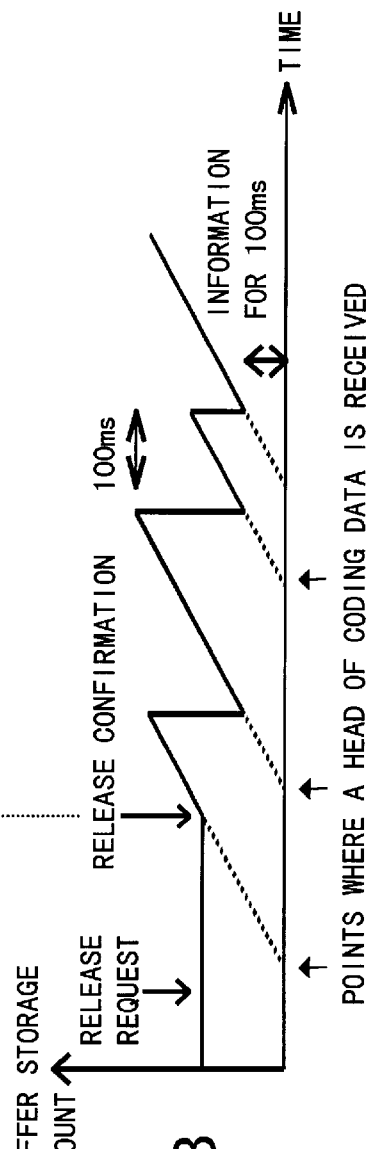
FIG. 4A
FIG. 4B

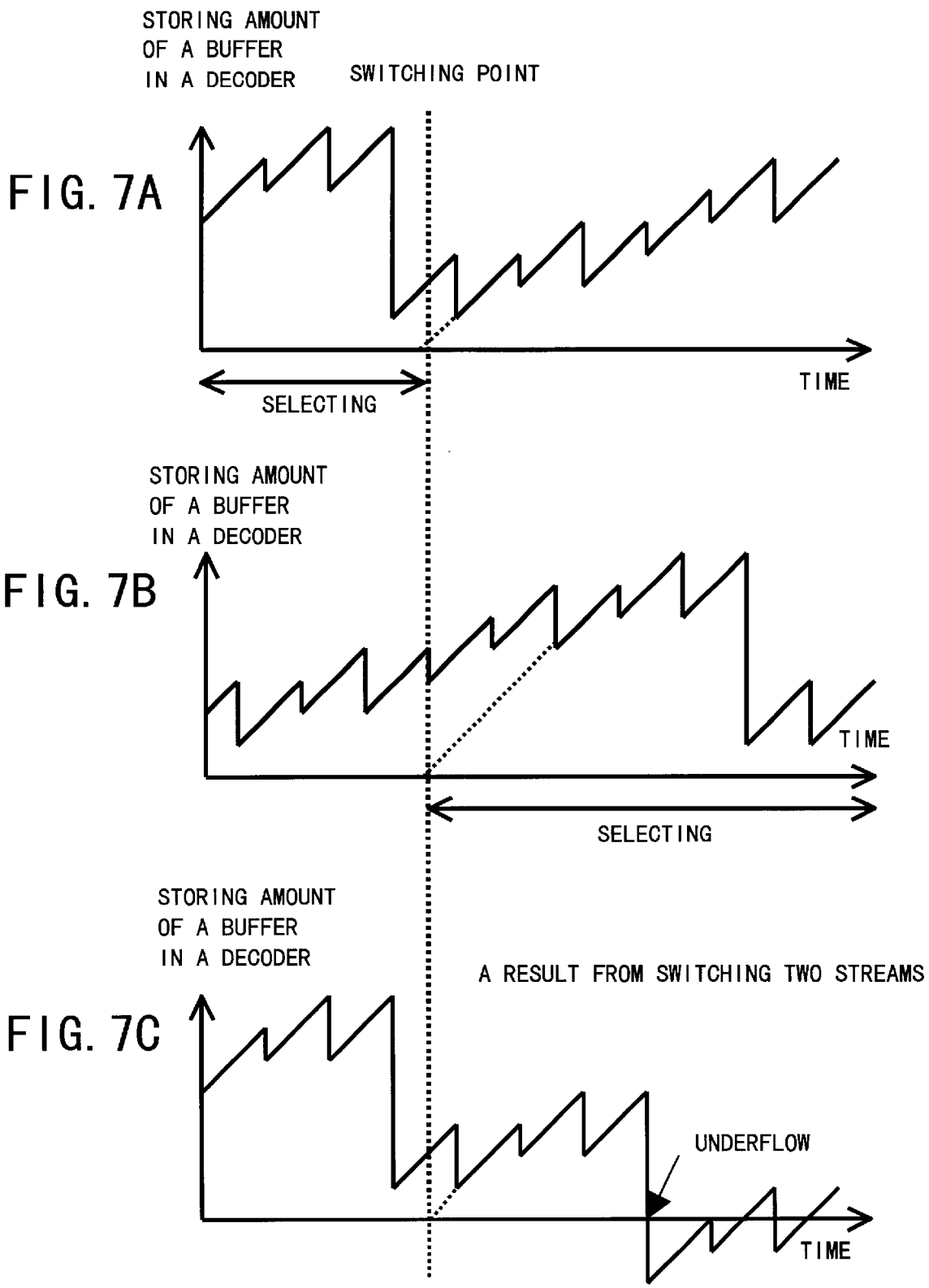

DATA SWITCHING APPARATUS FOR SWITCHING RECEIVED DATA WITHOUT CHANGING CODING UNIT

BACKGROUND OF THE INVENTION

1. Field of the Invention

The present invention relates to a data switching apparatus used in transmission or broadcasting apparatuses for selecting and transmitting the data from a plurality of received data without changing coding unit.

2. Description of the Prior Art

FIG. 16 shows a conventional data switching apparatus provided in a TV studio for example. In FIG. 16, received data 110A and 110B are TV signals (NTSC signals and so on) input to the present apparatus. The received data 110A and 110B include information such as a vertical drive pulse which shows a frame (synchronization). The conventional data switching apparatus also include frame detectors 101A, 101B, and switches 102A, 102B. The switches 102A and 102B respectively turn ON/OFF the received data 110A and 110B at the timing from the frame detectors 101A and 101B under the control of a control unit 103. The control unit 103 controls either of switches 102A and 102B to turn ON/OFF by an external switching request (not shown).

The operation is explained below. A plurality of received data 110A and 110B input into the present apparatus are TV signals including synchronization signals. The timing of the synchronization signals is controlled so that respective timings of the received data 110A and 110B are the same.

The frame detectors 101A and 101B detect frames (synchronization signal) such as a vertical driving pulse of the received data and provides them to the switches 102A and 102B. This frame represents the head of the data defining the TV image. The control unit 103 instructs either of the switches 102A and 102B to be ON and the other to be OFF.

The switches 102A and 102B are switched by the instruction of the control unit 103 according to the frame timing of the frame detectors 101A and 101B. Since the frames of a plurality of received data 110A and 110B are all synchronized, the timing provided from the frame detectors 101A and 101B to the switches 102A and 102B are all synchronized. Therefore, the respective switches 102A and 102B are switched at the same time. At this time, only one switch turns ON and the other turns OFF.

In this way, the present apparatus always selects one data stream from a plurality of received data. In FIG. 16, only two pairs of frame detector 101A and switch 102A, and frame detector 101B and switch 102B are shown for simplicity of explanation. But, the data switching apparatus of FIG. 16 may have plural pairs of the frame detectors and switches. Since the switches 102A and 102B are switched at the head of the frame upon selecting the data, the frame of the data at the vicinity of switching point can be held in a constant period.

Therefore, the data switched by this apparatus does not have bad influence to the image due to switching such as a image turbulence (noise) and a step-out of the frame synchronization, and therefore, the image can be kept in the same as a state without switching the data.

As explained above, the conventional switching apparatus has been necessary to meet frames of all data for each frame according to an externally applied clock. Accordingly, there is a problem in that the conventional switching apparatus cannot process the data whose respective frame timings are not synchronized.

Moreover, since the frame periods of all received data must be the same, the conventional apparatus cannot process the data if the received data is encoded with a variable length code.

SUMMARY OF THE INVENTION

It is an object of the present invention to provide a data switching apparatus which links any data at any point when it switches data.

It is another object of the present invention to provide a data switching apparatus which links the data without breaking the data.

It is a further object of the present invention to provide a data switching apparatus which operates normally even if the data unit detector delays in detecting the data unit.

It is a still further object of the present invention to provide a data switching apparatus which discards the undesired data by replacing undesired data with invalid data.

It is a further object of the present invention to provide a data switching apparatus which decreases the video buffer remaining quantity in the decoder to prevent the buffer from overflowing.

It is a further object of the present invention to provide a data switching apparatus which increases the video buffer remaining quantity in the decoder to prevent the buffer from underflowing.

It is a further object of the present invention to provide a data switching apparatus which holds the video buffer remaining quantity in the decoder to prevent the buffer from overflowing and underflowing.

It is a further object of the present invention to provide a data switching apparatus which increases the switching points for switching the data normally.

According to one aspect of the invention, a data switching apparatus includes plural data unit detectors each for detecting a coding unit of a data from a received data; plural data storages each for storing a received data in a buffer and transmitting the received data at a given time from a point specified by the data unit detector; and a data selecting unit for selecting and transmitting only one data stream from a plurality of data streams which are transmitted respectively from the plural data storages.

According to another aspect of the invention, in the data switching apparatus, the data storage starts and terminates the data transmission at the end of the coding unit in the data detected by the data unit detector; and the data selecting unit switches the data streams from the data storage so that each of the data stream from respective data storage is linked together in a continuous data stream.

According to other aspect of the invention, in the data switching apparatus, each respective storage include a delay unit which delays the received data for more than a predetermined time.

According to further aspect of the invention, the data switching apparatus further includes a pattern generator for transmitting a predetermined data pattern to the data selecting unit upon request from the data selecting unit.

According to further aspect of the invention, in the data switching apparatus, the pattern generator generates and transmits invalid data, that is, data quantity requested by the data selecting unit.

According to further aspect of the invention, in the data switching apparatus, the pattern generator generates and transmits data quantity requested by the data selecting unit and stuff data for video data.

According to further aspect of the invention, in the data switching apparatus, the pattern generator generates and transmits data quantity requested by the data selecting unit and unit coding video data with small information quantity.

According to further aspect of the invention, the data switching apparatus further includes a comparator for comparing each value of respective decoding start delay time included in two received data to be switched, wherein the data selecting unit inserts stuff data in the video data when the decoding start delay time before switching is larger than that after switching, and inserts unit coding video data with a small information quantity in the video data when the decoding start delay time before switching is smaller than that after switching, so that the respective decoding start delay times included in the two received data to be switched become the same.

According to further aspect of the invention, a data switching apparatus includes plural data unit detectors each for detecting a coding unit of received data; plural data storages each for storing a received data in a buffer and transmitting the received data specified from the data unit detector at a given time from a point specified by the data unit detector; and a multiplexer for multiplexing and transmitting any numbers of data streams from a plurality of data streams which are transmitted respectively from the plural data storages.

According to further aspect of the invention, the data switching apparatus further includes a pattern generator for transmitting a predetermined data pattern to the multiplexer upon request from the multiplexer.

According to further aspect of the invention, the data switching apparatus further includes a pattern generator for transmitting a predetermined data pattern to the multiplexer upon request from the multiplexer.

According to further aspect of the invention, the data switching apparatus further includes plural switching notifiers each for notifying originators for receiving data to be switched of an advance and completion notices for switching the data in response to the request from the data selecting unit upon switching.

According to further aspect of the invention, the switching notifier requests the transmission data source to generate breaking points for the data coding unit frequently.

BRIEF DESCRIPTION OF THE DRAWINGS

The present invention will become more fully understood by the accompanying drawings which are given by way of illustration only, and thus are not limitative of the present invention, and wherein:

FIGS. 4A, B show an operation of buffers of a second embodiment of the present invention.

FIGS. 7A, B, C show video buffer residual quantity of a decoder of the fourth embodiment of the present invention.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Embodiment 1

Figure 1:
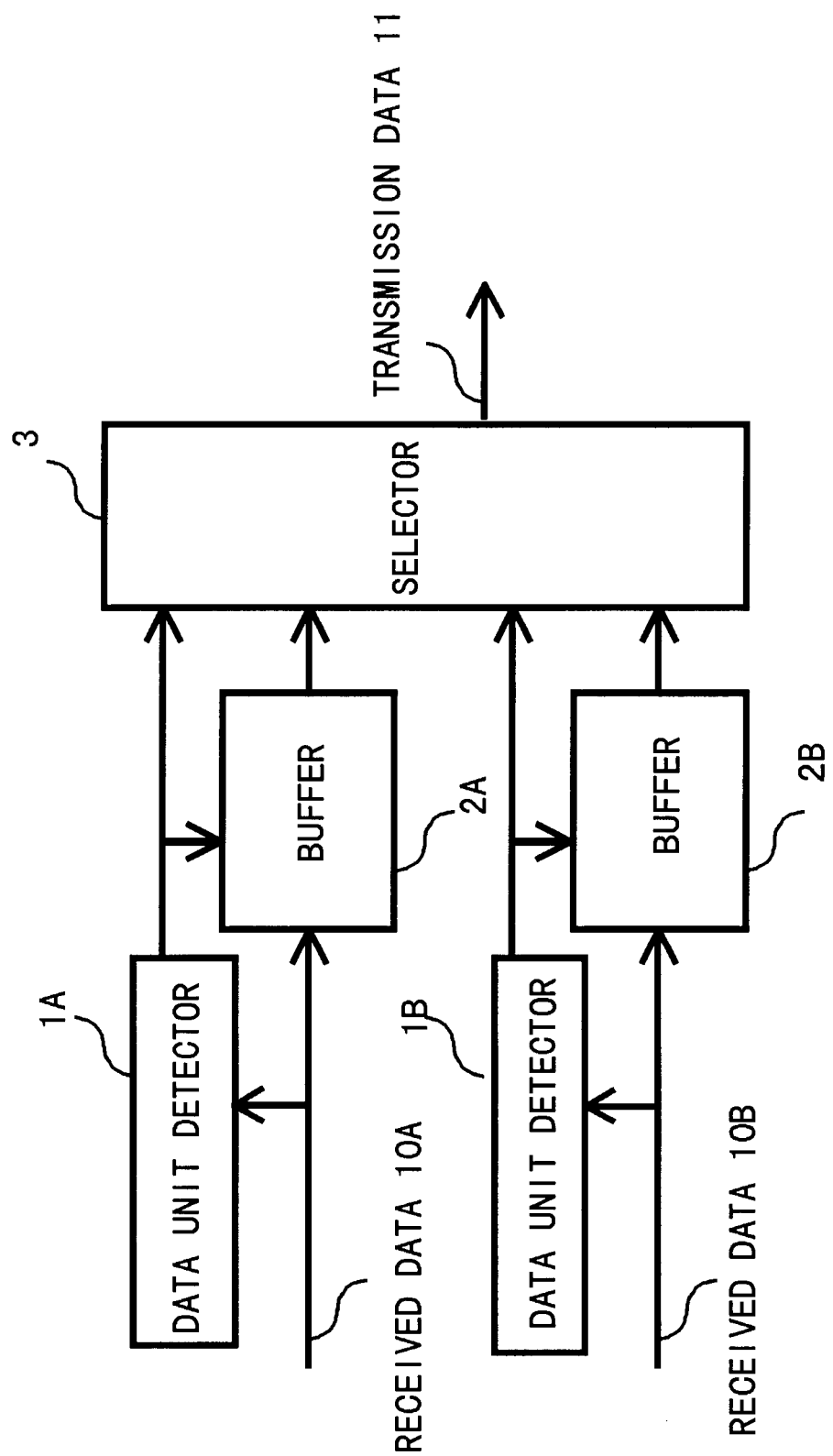
FIG. 1 shows a data switching apparatus of a first embodiment of the present invention.

FIG. 1 is a block diagram showing a data switching apparatus of a first embodiment of the present invention. In FIG. 1, received data 10A and 10B are input in the data switching apparatus as a coded data stream. The data switching apparatus of FIG. 1 also includes data unit detectors 1A and 1B and buffers 2A and 2B. The data unit detectors 1A and 1B detects the code unit of the received data. The buffers 2A and 2B receives and stores the received data 10A and 10B, and transmits the data after the point informed from the data unit detectors 1A and 1B to the selector 3, respectively.

A selector 3 selects one of the data stream from a plurality of buffers 2A and 2B and transmits it as a transmitting data. The selector 3 also controls the start and termination of the transmission data from the buffers 2A and 2B. In FIG. 1, only two pairs of data unit detector 1A and buffer 2A, and data unit detector 1B and buffer 2B are shown for simplicity of explanation. But, the data switching apparatus of FIG. 1 may have more than two pairs of data unit detector and buffer.

The operation of the data switching apparatus of FIG. 1 is explained below.

The received data 10A and 10B input into this data switching apparatus are encoded by a certain coding unit. In the data switching apparatus, a plurality of the received data 10A and 10B are input into the data unit detectors 1A and 1B and the buffers 2A and 2B, simultaneously.

The data unit detectors 1A and 1B detect coding units in the received data 10A and 10B and inform the buffers 2A and 2B of information of the coding units. For example, in MPEG-2 system standard, when a payload-unit-start-indication in the header of a transport stream is set and data stream is aligned in PES layer, the data unit detectors 1A and 1B recognize that a new data unit is started in the transport stream packet. If a splice-point-flag in a transport stream adaptation field is set and there is a transport stream packet with a splice-countdown of 0, the data unit detectors 1A and 1B recognize that a new data unit is started in the next packet. In this way, since a communication protocol usually has information showing various data units, the data unit detectors 1A and 1B detect the information showing various data units.

The buffers 2A and 2B store the received data 10A and 10B. The buffers 2A and 2B also recognize and hold points in the buffer at the start and end data regarding the coding unit of the received data 10A and 10B according to the information of the data coding unit output from the data unit detectors 1A and 1B.

The buffers 2A and 2B operate differently depending on which is selected by the selector 3.

(i) When the buffer is not selected by the selector:

Any one of the buffers 2A and 2B not selected by the selector always stores new data and discards the old data. For example, if informed from the data unit detectors 1A and 1B that the received data 10A and 10B are at the head of the coded data, any one of the buffers 2A and 2B discards the stored data and stores the received data from the beginning.

(ii) When any one of the buffers is selected by the selector:

When any one of the buffers 2A and 2B is selected by the selector 3, the selected buffer 2A or 2B starts to transmit the data from the head of the data to the selector 3. The selected buffer 2A or 2B continues to output the stored data in the buffers 2A or 2B to the selector 3 until the selection is released.

Figure 2:
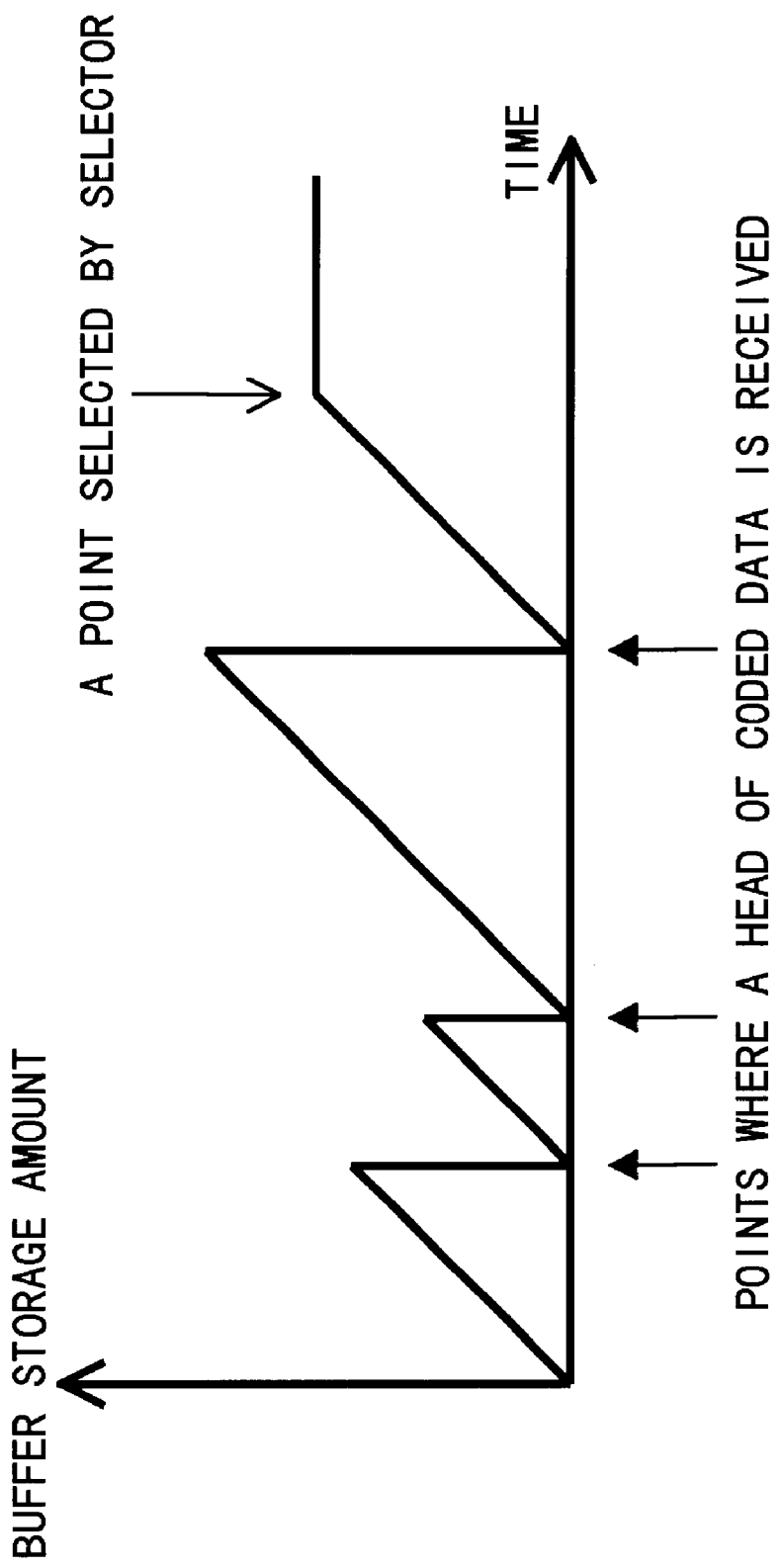
FIG. 2 shows an operation of buffers of the first embodiment of the present invention.

FIG. 2 shows time variation of the buffers 2A and 2B. The buffers 2A and 2B respectively store the received data 10A and 10B and discard all past data upon receiving the head of the coded data. The buffers 2A and 2B repeatedly carry out this operation for all data. While storing the received data 10A and 10B, if any one of the buffers 2A and 2B is selected by the selector 3, the selected buffer starts to transmit the data from the head of the coded data to the selector 3. The buffers 2A and 2B respectively store the received data 10A and 10B and output the stored data to the selector 3 at the same time.

There is an another method for storing the received data 10A and 10B, in which the buffers 2A and 2B are used as loop buffers. According to this method, when the buffers 2A and 2B store the data by the quantity of buffer size, old data is overwritten with a new data. In this way, latest data is always stored until the upper limit of the buffer size. The buffers 2A and 2B store the received data 10A and 10B, and at the same time store points of the head data which are informed from the data unit detectors 1A and 1B. The buffers 2A and 2B start to output the data from the points of the latest received head data when the buffers 2A and 2B are selected by the selector 3.

The data unit detectors 1A and 1B detect the head and end of the coded data while the buffers 2A and 2B are selected by the selector 3, and inform the buffers 2A and 2B respectively of the detected head and end information. The selector 3 pre-informs to release the currently selected buffers 2A and 2B before actually switching the buffers 2A and 2B.

When being previously informed of switching (releasing), the buffers 2A and 2B output the encoded data until the end data which are detected by the data unit detector 1A and 1B and send the confirmation signal to be released to the selector 3. After then, the selector 3 selects any one of the buffers 2A and 2B. Upon the selection of one of the buffers, the selected buffer starts to transmit the data from the head of the data to the selector 3. The released buffer prepares to start to output the data from the head of the coded data when it is selected next. The selector 3 selects one buffer from a plurality of the buffers 2A and 2B, and outputs either of the received data 10A or 10B received from the buffers 2A or 2B, respectively, as the transmission data 11.

Figure 3:
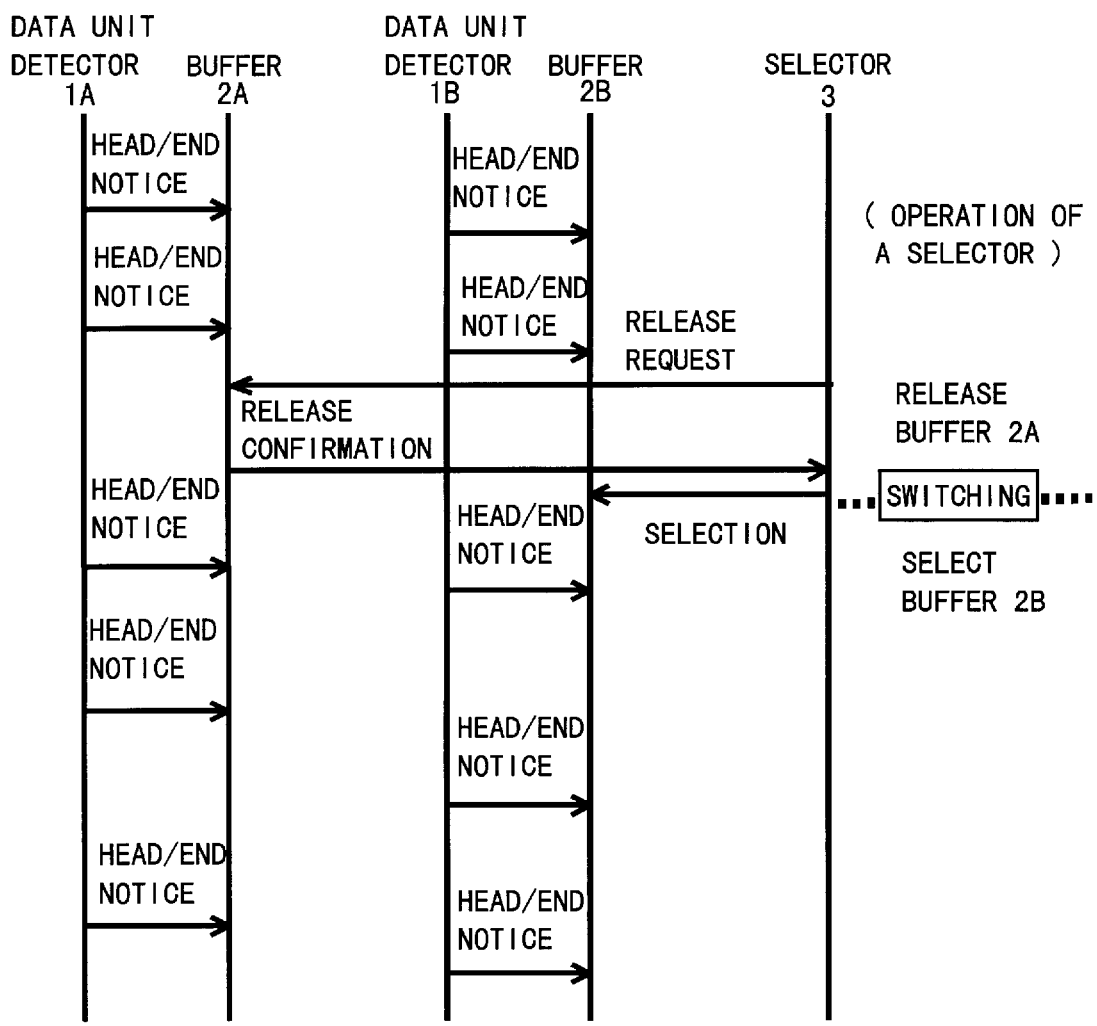
FIG. 3 is a timing chart of control signals of the data switching apparatus of the first embodiment of the present invention.

FIG. 3 is a timing chart of control signals among the data unit detectors 1A and 1B, buffers 2A and 2B and a selector 3. In FIG. 3, the data unit detectors 1A and 1B detect the head and end of the coded data, and respectively inform the buffers 2A and 2B of the head and end of the coded data for each detection. In FIG. 3, it is assumed that the buffer 2A is selected by the selector 3 and the buffer 2B is not selected by the selector 3. The buffer 2A selected by the selector 3 is set so that it operates to always detect the end point of the data which is informed from the data unit detector 1A. The buffer 2B not selected by the selector 3 is set so that it operates to always detect the head point of the data which is informed from the data unit detector 1B.

When the selector 3 wishes to switch from buffer 2A to buffer 2B, the selector 3 informs the buffer 2A which is currently receiving the data of "release request". The buffer 2A continues to transmit the data until the last point of the coded data which has been informed from the data unit detector 1A. When the last point of the coded data is reached, the buffer 2A informs the selector 3 of "release request" and terminates the data output. The buffer 2A continues to detect the head point of the coded data which is provided from the data unit detector 1A so that the coded data is transmitted from the head point when the buffer 2A is selected next by the selector 3.

The selector 3 receives "release confirmation" from the buffer 2A and informs the buffer 2B of "selection". After that, the selector 3 receives the data from the buffer 2B and outputs it as a transmission data 11. Upon receiving "selection", the buffer 2B starts to transmit the data which has been stored in the buffer 2B from the head point of the coded data which has been informed from the data unit detector 1B.

As explained above, the coded data received by this data switching apparatus can be switched by keeping the coding unit.

Embodiment 2

According to a second embodiment of the present invention, the data received into the buffers 2A and 2B are delayed for a predetermined time. As a result of this, if the information of the head or end of the coding unit of the data detected by a data unit detector is delayed to the buffers, the head or end point can be recognized accurately because there is a sufficient time before transmitting it to the data selector 3. A delay function can be realized by delaying reading time of the buffers 2A and 2B. The second embodiment of the present invention is explained in detail below.

FIG. 4 shows time variation of the buffers 2A and 2B which are added with the delay function of the second embodiment of the present invention.

For example, 100 ms is used as a predetermined time for explanation. As shown in FIG. 4(a), the buffer 2B stores the received data 10B and discards all the data after waiting 100 ms from the reception of the head of the coded data. Therefore, the data for 100 ms which is delayed from the head data remains in the buffer 2B. Then, the buffer 2B again stores the received data 10B and discards the past data after 100 ms from the reception of the head of the coded data. The buffer 2B carries out this operation repeatedly.

When the buffer 2B is selected by the selector 3 upon storing the received data 10B, the selected buffer 2B starts to transmit the stored data from the head of the coded data to the selector 3. The buffer 2B outputs the data to the selector 3 while storing the received data 10B. At this time, since the data to be stored is the same as those to be output, the stored data quantity in the buffer becomes constant.

FIG. 4(b) is explained below. In FIG. 4(b), while the buffer 2B is selected by the selector 3, the buffer 2A which has been selected so far transmits the coded data until the last point of the data and informs the selector 3 of "release" confirmation, and terminates the state of "release request". At this time, the data output from the buffer 2A is terminated, so the residual quantity of the buffer increases. After then, the buffer 2A becomes a state which is not selected by the selector 3. Therefore, the buffer 2A does not transmit the data to the selector 3, and it only stores and discards the data.

In a system where the received data 10A and 10B and the control signals for controlling the buffers are not completely synchronized, the delay of the control signals can be permitted by delaying storage of the data in the buffer. In this case, if the data for 100 ms is stored in the buffer, even if the control signal informing the last data from the data unit detector 1A is delayed by several tens of ms, the buffer 2A can inform the selector 3 of "release confirmation" when the last data is transmitted to the selector 3, because the buffer 2A has not yet transmitted the last data to the selector 3.

Embodiment 3

Figure 5:
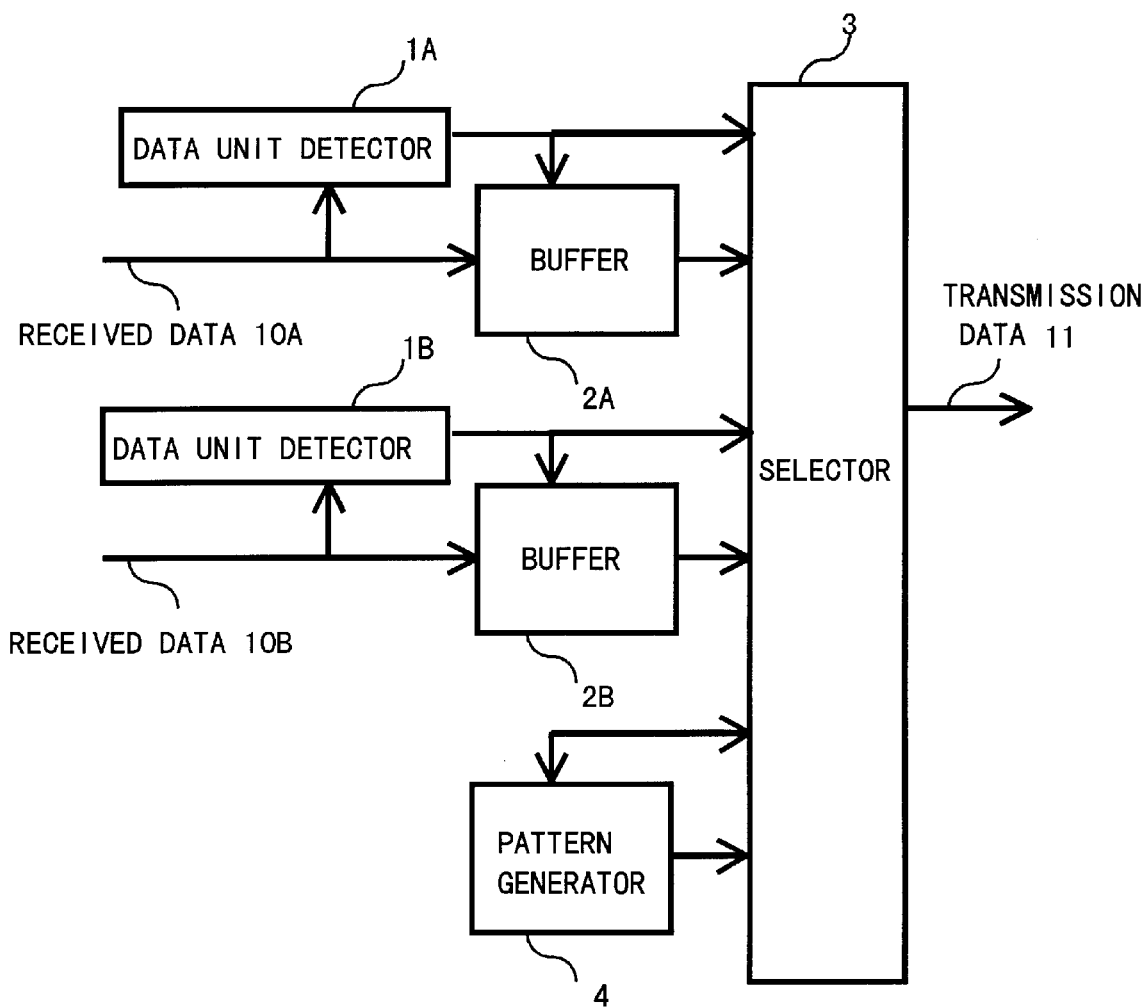
FIG. 5 shows a data switching apparatus of a third embodiment of the present invention.

FIG. 5 shows a data switching apparatus including a pattern generator 4 for generating a predetermined data pattern to the first embodiment of the present invention. In the first embodiment of the present invention, no data is inserted between two data streams, namely, the data stream before the data switching and the data stream after the data switching, upon data switching. According to the data switching apparatus in a third embodiment of the present invention, predetermined data are inserted between the two data streams using the pattern generator 4 upon data switching.

In FIG. 5, the pattern generator 4 generates predetermined data and outputs the data having predetermined contents to the data selector 3. FIG. 5 has only one pattern generator 4, however, one pattern generator 4 for generating various patterns or a plurality of pattern generators 4 for generating each pattern may be provided in order to generate various kinds of data patterns. In FIG. 5, equivalent portions as in FIG. 1 are provided with the same reference numbers. Repeated description thereof is not necessary and is omitted.

The operation of the data switching apparatus of the third embodiment of the present invention is described below.

The pattern generator 4 generates pattern data which have been stored or externally provided. The data may be output once or repeatedly. If there is a break of the coding unit in the data, the pattern generator 4 recognizes a point of the break. The data transmitting procedure of the pattern generator 4 is the same as that of the buffers 2A and 2B. The data transmitting procedure of the pattern generator 4 is described below.

When the selector 3 selects the pattern generator 4, the pattern generator 4 starts to transmit the data stored in the pattern generator 4. When receiving "release request" from the selector 3, the pattern generator 4 transmits the data until that of the break of the coding unit. Then the pattern generator 4 informs the selector 3 of "release request" to terminate the data transmission. If there is no data stored in the pattern generator 4, the pattern generator 4 informs the selector 3 of "release confirmation" without waiting "release request" from the selector 3 to terminate the data transmission.

The selector 3 selects any one of the pattern generator 4, buffer 2A and buffer 2B to output the data from them as the transmission data 11. Moreover, upon switching at the selector 3, the data errors such as a step-out of the frame synchronization do not easily occur in the output data from the selector 3 by delaying the received data and switching the data as described above.

Embodiment 4

A data switching apparatus of a fourth embodiment of the present invention is constructed so that a pattern generator generates and outputs invalid data. The invalid data represent data which have only a frame for forming the coded data, data which have only a synchronization signal or null data in MPEG-2 transport stream and so on. Although the above invalid data are not actually significant data, they maintain frame synchronization.

Followings are examples which can be realized using the invalid data.

(i) If there is no received data:

When neither buffers 2A and 2B receive the received data 10A and 10B, the selector 3 selects the invalid data from the pattern generator 4, thereby the data output from the selector 3 can maintain the frame synchronization. Then, when the received data 10A and 10B are input, the selector 3 can output the received data smoothly.

If the above processing is not carried out, the data terminal for receiving the transmission data output from the selector 3 takes a lot of time because the data terminal must search the frame in the transmission data and establish the synchronization after the selector 3 receives and transmits the normal received data 10A and 10B. The method in which the selector 3 selects the invalid data from the pattern generator 4 can be also used as a method for temporarily avoiding breakdown of the apparatus if the processing portion of the received data 10A and 10B malfunctions in the apparatus.

(ii) The received data is a multimedia data:

The received data 10A and 10B are multimedia data including a plurality of media, for example, the received data is MPEG-2 transport stream is explained below.

Figure 6:
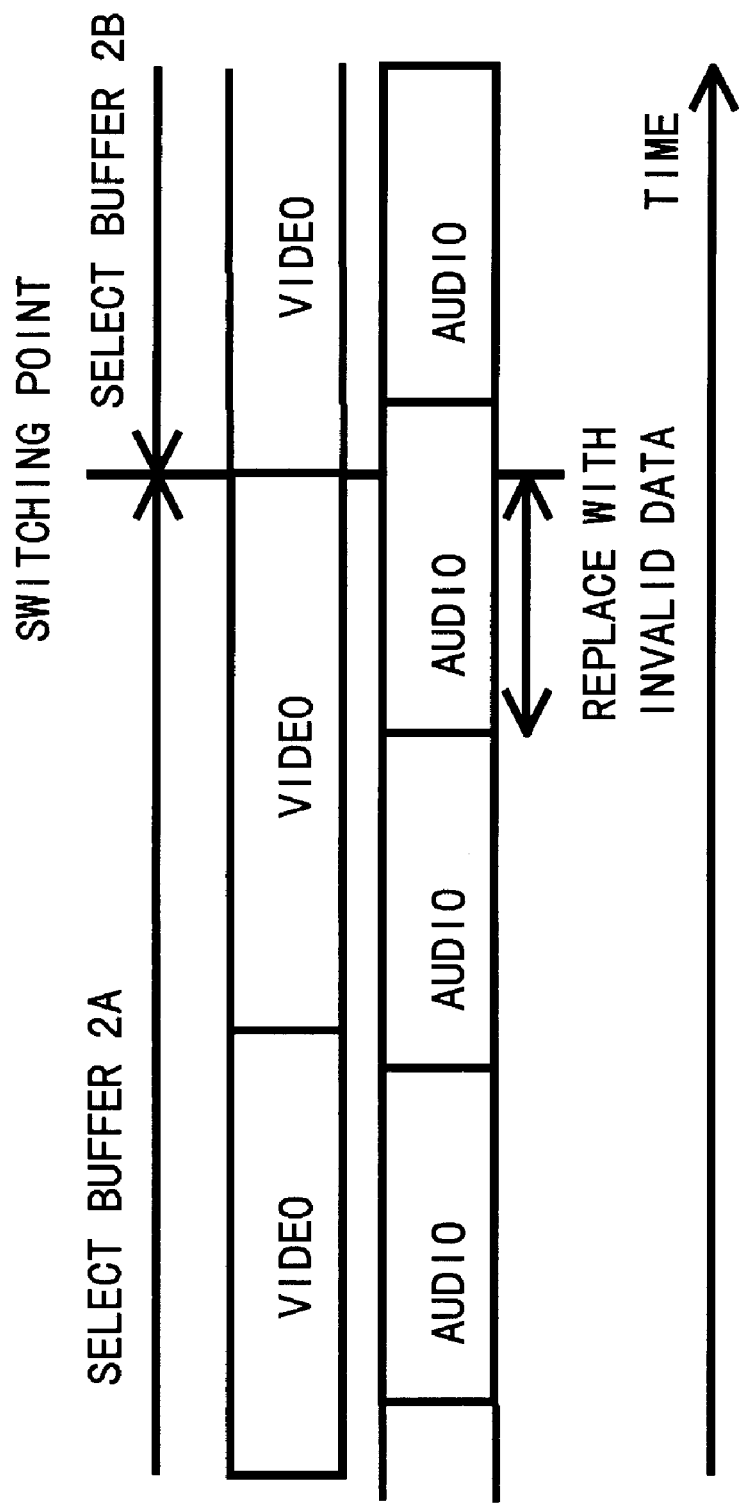
FIG. 6 is a diagram explaining a received data of a fourth embodiment of the present invention.

FIG. 6 shows a time chart of contents of the received data 10A and 10B in the vicinity of a switching point of the data stream. At the switching point, the buffer 2A is switched to the buffer 2B, then the received data 10A are switched to the received data 10B. It is assumed that the received data 10A and 10B include a video and audio signal in MPEG-2 transport stream. It is also assumed that the video and audio respectively have a frame which is a coding unit and each frame is multiplexed without any relationship therebetween.

The data switching apparatus of the fourth embodiment of the present invention can transmit the invalid data generated by the pattern generator so that the frame synchronization can be maintained by transmitting the invalid data even if there is no data to be selected. When there is an undesired data in the received data, it is possible to eliminate the undesired data by replacing it with the invalid data.

In FIG. 6, it is assumed that the last data is decided depending on the frame of the video data and the last video data is switched by the selector 3 at the switching point. Since the switching point separates the audio frame, the former portion in the separated audio frame is replaced with the invalid data. The selector 3 switches the buffer 2A to the pattern generating apparatus 4 at the moment when the audio data are output from the buffer 2A to output the invalid data, and the selector 3 switches the pattern generating apparatus 4 to the buffer 2B when the transmission of the audio data is terminated. According to such switching, multimedia data can be transmitted based on the coding unit. This embodiment also can be used to realize the splicing function which is defined by MPEG-2 system.

In the variable length coded data such as MPEG-2 video data, the decoder generally decodes the data by storing appropriate amount of the data. The data, which is decoded for each coding unit for a predetermined period, usually does not arrive to the decoder for a predetermined period due to the variable length coding. By storing appropriate amount of the data, it is possible to prevent the data from running short even if the receiving period becomes longer. The quantity to be stored at decoding is included in the form of "vbv-delay" in MPEG-2 video. The "vbv-delay" instructs when it starts to decode after receiving the data. The "vbv-delay" indicates the decoding start delay time and is multiplexed in the video data.

In one stream, the data quantity to be stored in the decoder is controlled by the encoder and varies within a predetermined range. At this time, the buffer for storing the data in the decoder is controlled so that the data quantity does not underflow or overflow. When two video data having no relation to each other, however, are switched and spliced by the data switching apparatus as shown in the fourth embodiment of the present invention, each data amount to be stored is different for the former and latter data, namely, the buffer residual quantity estimated by the encoder after switching is different from the actual residual quantity. Therefore, the decoder which has received the two successive video data has a possibility to overflow or underflow after switching.

FIGS. 7A, B, C show the data quantity to be stored in the buffer when two video data having no relation to each other are switched and spliced by the data switching apparatus as described above. FIG. 7A shows video buffer quantity of the decoder in which the first stream is stored normally without being switched. FIG. 7B shows the video buffer quantity of the decoder in which the second stream is stored at the normal state without being switched. FIG. 7C shows the video buffer quantity of the decoder in which the first and the second streams are received. In FIG. 7A and FIG. 7B, each time variation of the buffer quantity of two decoders varies within a range. As shown in FIG. 7C, the underflow (break down) of the buffer occurs after switching because the first data stream in which the buffer quantity is small as shown in FIG. 7A is switched to the second data stream in which the buffer quality is large as shown in FIG. 7B at the switching point. FIGS. 7A, B, C show a case of the underflow, but contrary to this, there may be a case of overflow. In this way, when two video data streams having no relation to each other are switched and spliced by the data switching apparatus, there is a possibility that the underflow or the overflow of the buffer occurs in the decoder.

Embodiment 5

A data switching apparatus of a fifth embodiment of the present invention includes a pattern generator which generates and transmits the video stuff data. Using the video stuff data, the video buffer residual quantity of the decoder, which receives the transmission data 11 output from the data switching apparatus, is adjusted. The video stuff data is not significant data for decoding the video data. It is possible, however, to maintain input data quantity constant which is input into the buffer upon receiving the normal video data, since this data are stored in the buffer of the decoder together with the valid data.

Then, the video stuff data are read together with the valid data by the decoder, and the stuff data are discarded immediately. At this time, the buffer residual quantity becomes small, since read-out data include the stuff data in addition to the original data. In other words, by including the video stuff data into the original data upon switching, the residual quantity of the video buffer of the decoder can be decreased after switching. According to the fifth embodiment of the present invention, it is possible to solve the above discussed problem, that is to say, overflow of the buffer upon switching can be avoided.

In order to avoid the buffer overflow upon switching, there is an another method in which the invalid data described in the fourth embodiment of the present invention are inserted in the original data upon switching. The invalid data are not stored in the video buffer, but the quantity of the video data is decreased. As the result, there is no video data input into the video buffer, but the video data is output from the video buffer, therefore the buffer residual quantity decreases. If the video data is kept at the constant rate, the video data becomes 0 during the period for inserting the invalid data, therefore the constant rate cannot be realized during the switching period. For the fifth embodiment of the present invention, since the video stuff data is used, it is possible to keep the video rate constant even during the switching period.

Embodiment 6

A data switching apparatus of a sixth embodiment of the present invention includes a pattern generator which generates and outputs unit coding video data with a small information quantity. Using this video data, the buffer residual quantity of the decoder is adjusted.

The unit coding video data with a small information quantity usually can be transmitted more than 30 pieces of the image data per a second. After the video data enter in the video buffer of the decoder, the data entered in the video buffer are not decreased much since the data quantity to be decoded during the unit decoding time is small. On the other hand, the quantity of the video buffer increases because the data quantity for transmitting one sheet of the image data is stored in the buffer during the average time.

In other words, the video buffer residual quantity of the decoder after switching can be increased by entering the unit coding video data with a small information quantity into the buffer upon switching. In this way, in the sixth embodiment of the present invention, it is possible to avoid the underflow of the buffer upon switching, which is discussed above.

The unit coding video data with a small information quantity are considered video data in which single color image data is encoded and video data which are the same as the preceding image data and so on. The video data being the same as the preceding image data is referred to as "not-coded" data in MPEG-2 video standard. The decoder for receiving the transmission data 11 displays the image during the switching period by inserting the unit coding video data with a small information quantity.

Figure 8A:
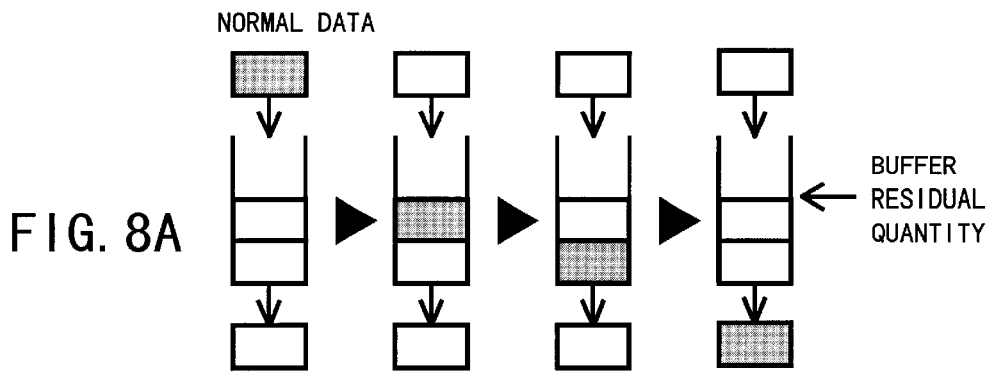
FIGS. 8A, B, C show video buffer residual quantity of a decoder of a sixth embodiment of the present invention.

FIGS. 8A, B, C show examples of the transfer of the video buffer residual quantity in the decoder which receives the transmitting data 11 from the data switching apparatus. In other words, it shows how the receiving buffer residual quantity varies according to the information quantity to be received. When the decoder receives the data which is coded by the constant rate, the video buffer receives the data at the constant rate. In this sixth embodiment, it is assumed that the received data is entered at the constant rate. Therefore, the data having less information quantity are entered often and the data having larger information quantity are entered less.

FIG. 8A shows transfer states from the time when the video data having the average information quantity arrive to the time when the buffer is read-out for decoding. In FIG. 8A, since the information quantity to be input is the same as that to be output, the buffer residual quantity does not change. In other words, since the information quantity to be input is the same as that to be output, the buffer residual quantity does not change as time passes.

Figure 8B:
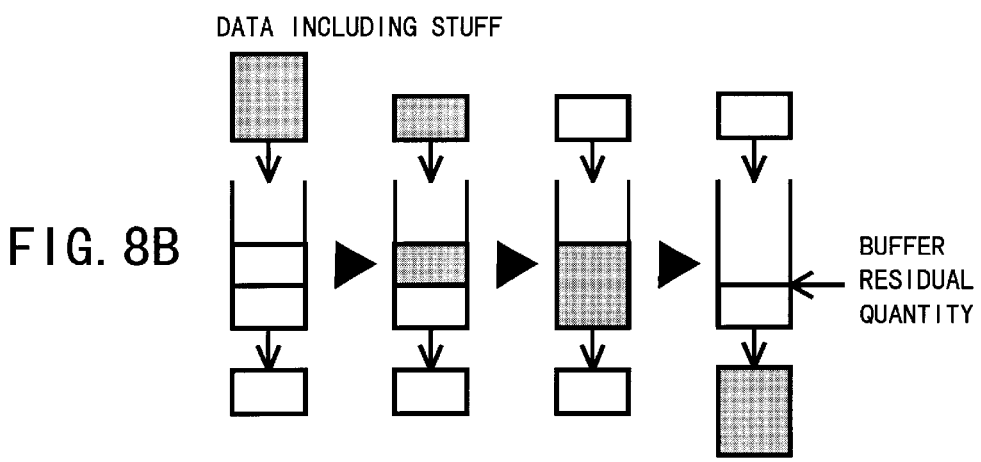

FIG. 8B shows an example in which the video data added with a stuff data are received in the video buffer. Since the data added with a stuff data is large, it takes a longer time for the data to enter in the buffer. As a result, only one of the video data added with a stuff data enter the buffer during the time when two coded data normally enter. The buffer residual quantity, however, does not change at the time when the video data added with a stuff data have entered the buffer. When the data are read from the buffer, the buffer residual quantity decreases since the output data quantity is larger than the input data quantity. During decoding, since the output data of a frame are read for each constant period in spite of the information quantity, the information quantity of the output data is larger than the information quantity of the input data. When the data are read from the buffer, the buffer residual quantity decreases since the output data quantity is larger than the input quantity.

Figure 8C:
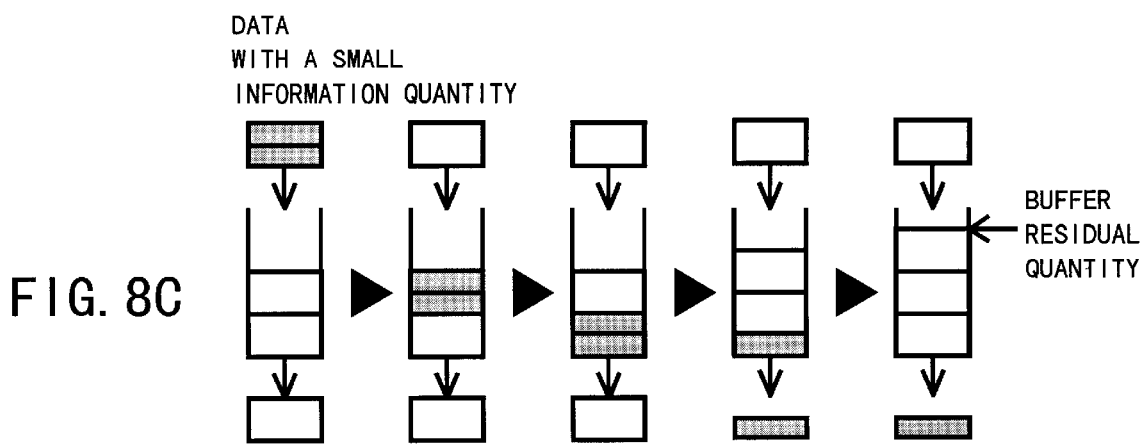

FIG. 8C shows an example in which the unit coding video data with a small information quantity enter the video buffer. Two unit coding video data enter the buffer since it does not take longer time for entering the buffer. In this case, the buffer residual quantity is the same as that of the above example of FIG. 8A. The data for two frames at the input enter the buffer during the time when data for two frames are read from the buffer. However, the buffer residual quantity increases since the input data quantity is larger than the output data quantity.

Embodiment 7

A data switching apparatus of a seventh embodiment of the present invention compares values of the decoding start delay time of the video data stored in the two buffers to be switched. If the data before switching is larger, the data switching apparatus inserts stuff data which is used in the fifth embodiment so that the value before switching becomes the same as that before switching. If the data before switching is smaller the data switching apparatus inserts the unit coding video data with a small information quantity which is used in the sixth embodiment so that the value before switching becomes the same as that before switching. The seventh embodiment of the present invention solves the problem described above, namely, the underflow and the overflow of the video buffer in the decoder for receiving the transmitting data 11.

Figure 9:
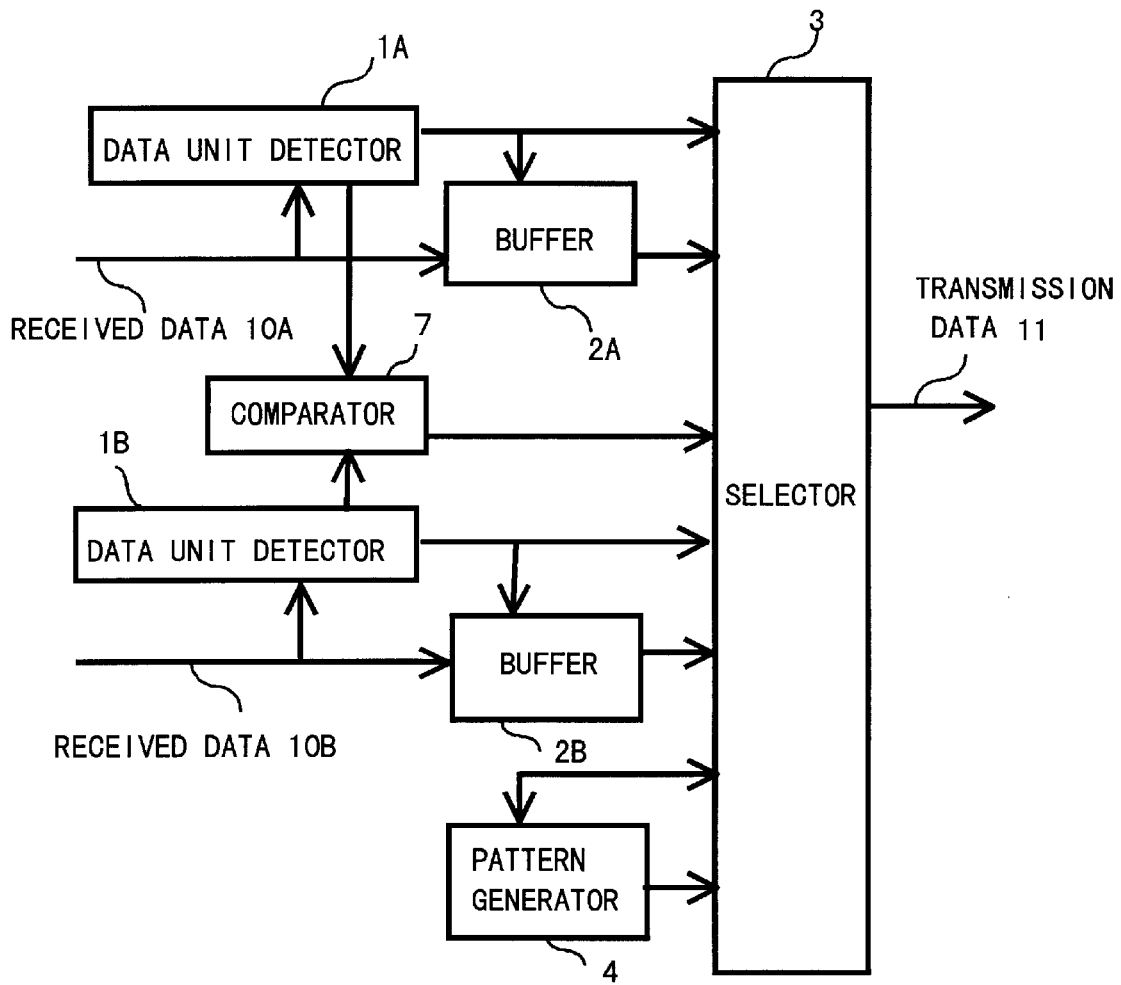
FIG. 9 shows a data switching apparatus of a seventh embodiment of the present invention.

FIG. 9 shows a data switching apparatus comprising a comparator 7 in addition to the data switching apparatus of the third embodiment of the present invention shown in FIG. 5. The comparator 7 compares each "vbv-delay" value indicating the decoding start delay time which is multiplexed for each coding frame unit. For MPEG-2 video data and so on, "vbv-delay" values indicating the decoding start delay time for each coding frame unit are multiplexed. If the "vbv-delay" value before switching is the same as that after switching, the remaining quantity of the video buffer of the decoder is kept normal.

At first, "vbv-delay values indicating the decoding start delay time" are explained using MPEG-2 video data. Generally, the video data are encoded for every one picture (approximately for every 33 ms). The information quantity of one picture is different since the variable length coding is generally used for encoding. In case that the transmission path is constant rate, the interval until the data of one picture encoded by the encoder arrive at the decoder is not constant. On the other hand, the decoder decodes the data of one picture for each constant interval. Therefore, the decoder stores the data so that the images to be decoded do not run out. As described above, the memory which stores the data is VBV buffer. A predetermined quantity ("vbv-delay" value) indicating the data quantity to be stored in the VBV buffer is determined so that the decoder operates steadily. The decoder can operate steadily in the order that the decoder receives the video data including the "vbv-delay" value and stores the time indicated by the "vbv-delay" value in the buffer, then starts to decode the video data. If the video data to be input thereafter are input in the buffer as they are, they are output at the appropriate timing. Then, the data is actually stored in the buffer during the time which the "vbv-delay" value in the video data indicates. These processes are all controlled by the encoder.

According to the data switching apparatus of the seventh embodiment of the present invention, the comparator 7 compares the "vbv-delay" value before switching with the "vbv-delay" value after switching. At this time, the "vbv-delay" value is included at the head of the coding unit of respective data and the "vbv-delay" value is also included in the data to be discarded just after the switching point of the old data. This "vbv-delay" value after the switching point of the old data is decoding start delay quantity to be succeeded by the new data after switching. On the other hand, there is a "vbv-delay" just after the switching point of the new data. When these two values are the same, the buffer does not break down, even if the data are input in the receiving buffer in succession.

If the "vbv-delay" value before switching is the same as the "vbv-delay" value after switching, the selector 3, for example, directly switches the buffer 2A to the buffer 2B. When the "vbv-delay" value before switching is larger than that after switching, the selector 3 switches the buffer 2A before switching to the pattern generator 4. The pattern generator 4 inserts the video stuff data by the amount in proportion to the difference of each "vbv-delay". After then, the selector 3 switches the pattern generator 4 to the buffer 2B after switching. When the "vbv-delay" value before switching is smaller than the "vbv-delay" value after switching, the selector 3 switches the buffer 2A before switching to the pattern generator 4. The pattern generator 4 inserts the unit coding video data with a small information quantity by the amount in proportion to the difference of the "vbv-delay". Then, the selector 3 switches the pattern generator 4 to the buffer 2B after switching. According to the above operation, the video buffer residual quantity of the decoder is kept normal even after the switching operation is carried out.

Embodiment 8

Figure 10:
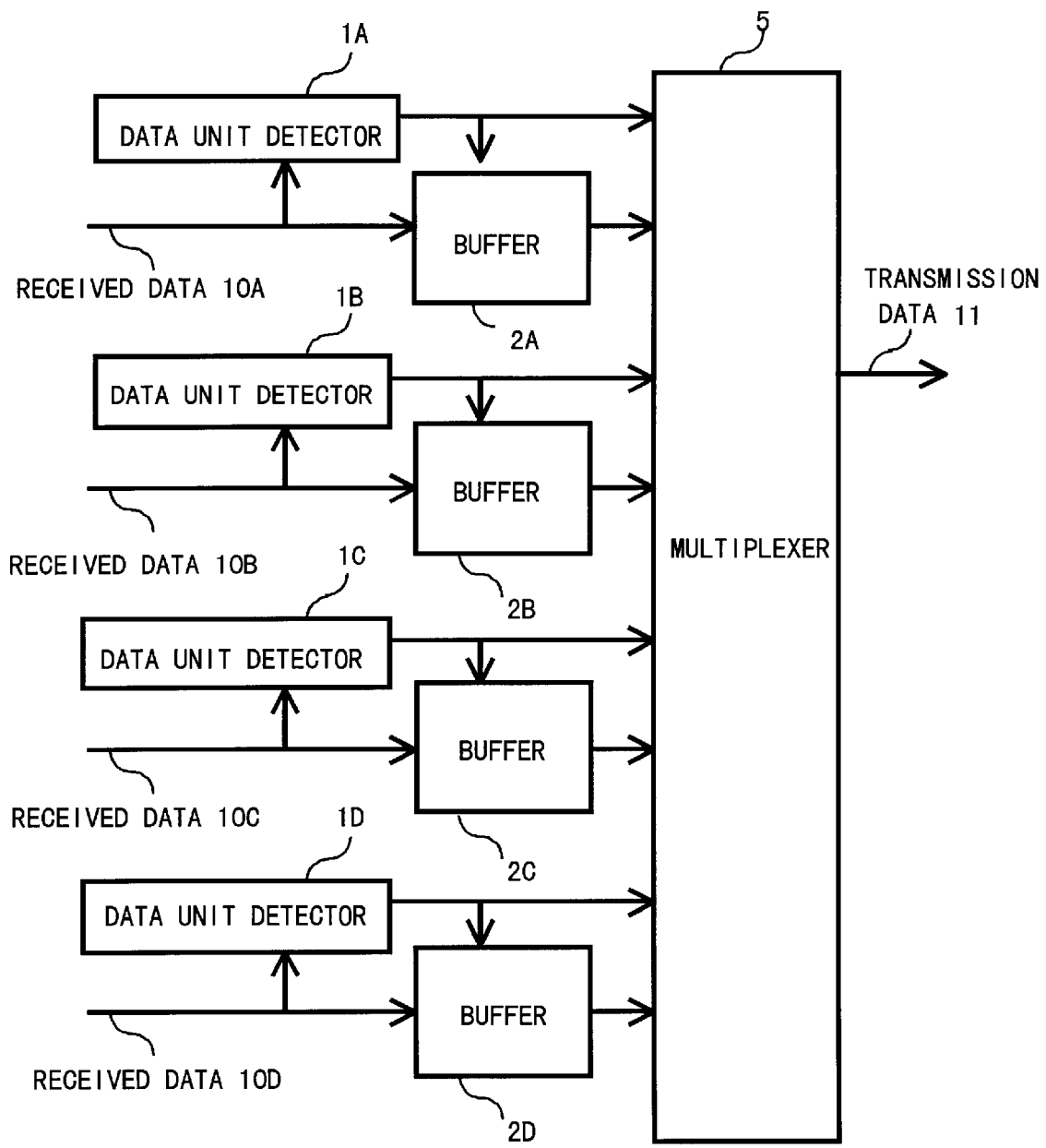
FIG. 10 shows a data switching apparatus of an eighth embodiment of the present invention.

FIG. 10 shows a data switching apparatus wherein the data selector of the first embodiment includes a data multiplexer. According to the first embodiment of the present invention, the data selector selects one of the n received data (n is an integer) and transmits the selected data. According to an eighth embodiment of the present invention, a data multiplexer selects m data out of n data (m is integer, $m \leq n$) and transmits data stream multiplexed with m data. Any selected m received data can be changed with any other received data at anytime.

In FIG. 10, the multiplexer 5 reads sequentially from buffers 2A, 2B, 2C and 2D the data to be multiplexed according to a certain multiplexed pattern and time-division-multiplexes the read data. In FIG. 10, equivalent elements as in FIG. 1 are provided with the same reference numbers. Repeated description thereof is not necessary and is omitted.

Figure 11:
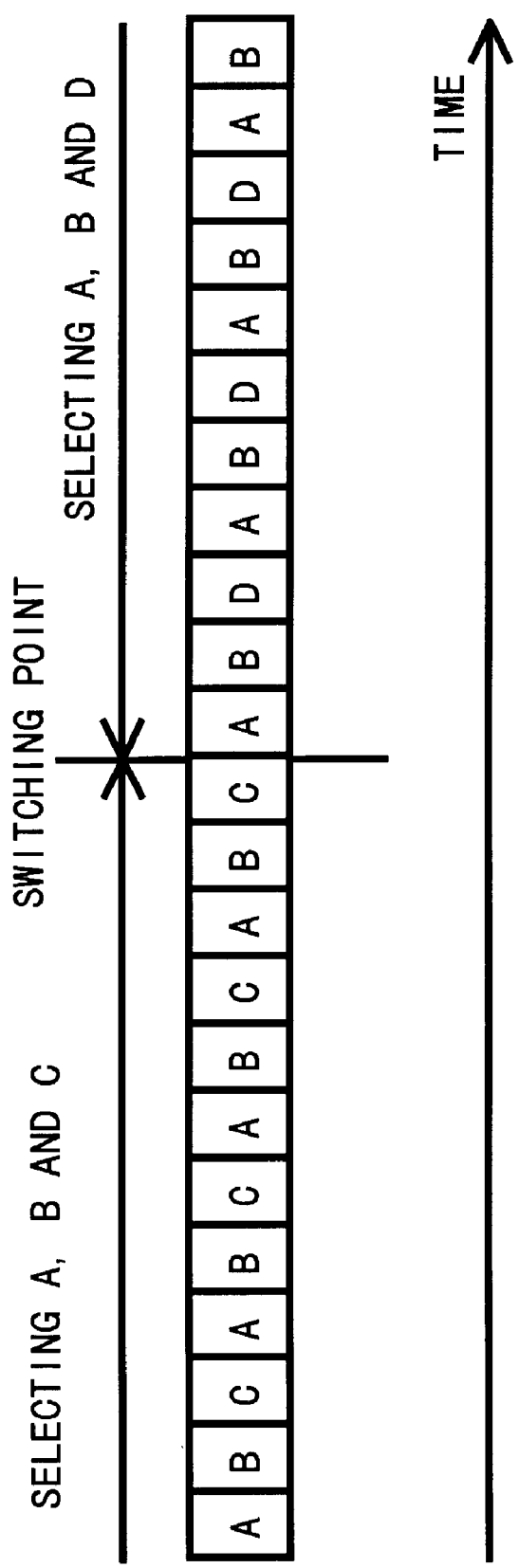
FIG. 11 shows a transmission data stream of the eighth embodiment of the present invention.

FIG. 11 shows a data stream of the transmission data 11 in FIG. 10. In FIG. 11, the data stream comprises the transmission data 11 in FIG. 10 transmitted from a plurality of the buffers 2A, 2B, 2C and 2D which are time-division-multiplexed by the multiplexer 5. In FIG. 11, the data from the buffers 2A, 2B, 2C and 2D are represented by A, B, C and D, respectively.

The multiplexer 5 selects the buffers 2A, 2B and 2C, and multiplexes and transmits the data A, B and C until the switching point, then selects the buffers 2A, 2B and 2D, and multiplexes and transmits the data A, B and D after the switching point. As a result, any data can be advantageously coupled each other to be multiplexed upon switching the data.

Embodiment 9

Figure 12:
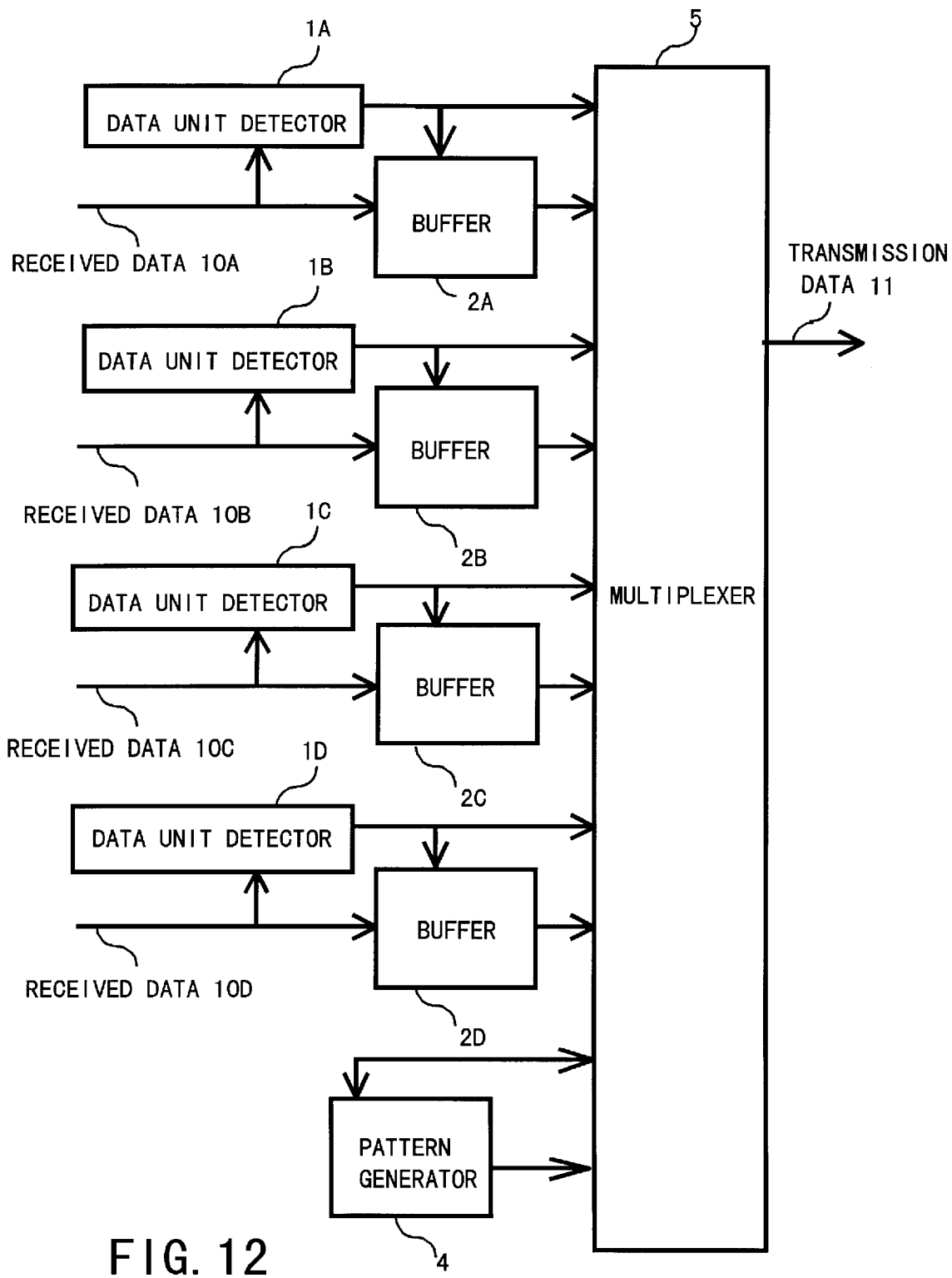
FIG. 12 shows a data switching apparatus of a ninth embodiment of the present invention.

FIG. 12 shows a data switching apparatus includes a pattern generator 4 for generating desired data patterns in addition to the data switching apparatus of the eighth embodiment. According to an eighth embodiment of the present invention, no data is inserted between the data stream before switching and data stream after switching. According to the data switching apparatus of the ninth embodiment of the present invention, the pattern generator 4 inserts predetermined data between the data stream before switching and data stream after switching upon data switching.

In FIG. 12, the pattern generator 4 generates predetermined data and outputs the data having predetermined contents to the multiplexer 5. FIG. 12 has only one pattern generator 4, however, one pattern generator 4 for generating various patterns or a plurality of pattern generators 4 for generating each pattern may be provided in order to generate various kinds of data patterns. In FIG. 12, equivalent portions as in FIG. 10 are provided with the same reference numbers. Repeated description thereof is not necessary and is omitted.

The operation of the data switching apparatus of the ninth embodiment of the present invention is described below. The pattern generator 4 generates pattern data which have been stored or pattern data provided from outside. The data may be output once or repeatedly. If there is a break of the coding unit in the data, the pattern generator 4 recognizes a point of the break. The data transmitting procedure of the pattern generator 4 is the same as that of the buffers 2A, 2B, 2C and 2D. The data transmitting procedure of the pattern generator 4 is described below.

When the multiplexer 5 selects the pattern generator 4, the pattern generator 4 starts to transmit the data stored in the pattern generator 4. When receiving "release request" from the multiplexer 5, the pattern generator 4 transmits the data until that of the break of the coding unit. Then the pattern generator 4 informs the multiplexer 5 of "release request" to terminate the data transmission. If there is no data stored in the pattern generator 4, the pattern generator 4 informs the multiplexer 5 of "release confirmation" without waiting "release request" from the multiplexer 5 to terminate the data transmission.

The multiplexer 5 selects any one of the pattern generator 4, the buffers 2A, 2B, 2C and 2D . . . to multiplex and output the data from them as transmission data 11. Thereby, any pattern data can be inserted and any received data can be multiplexed with any other data upon switching.

Moreover, when the data are multiplexed by the multiplexer 5, if the data are switched by keeping the coding unit according to the above control, the data errors such as a step-out of the frame synchronization and so on do not easily occur in the transmission data 11 sent from the multiplexer 5.

Embodiment 10

Figure 13:
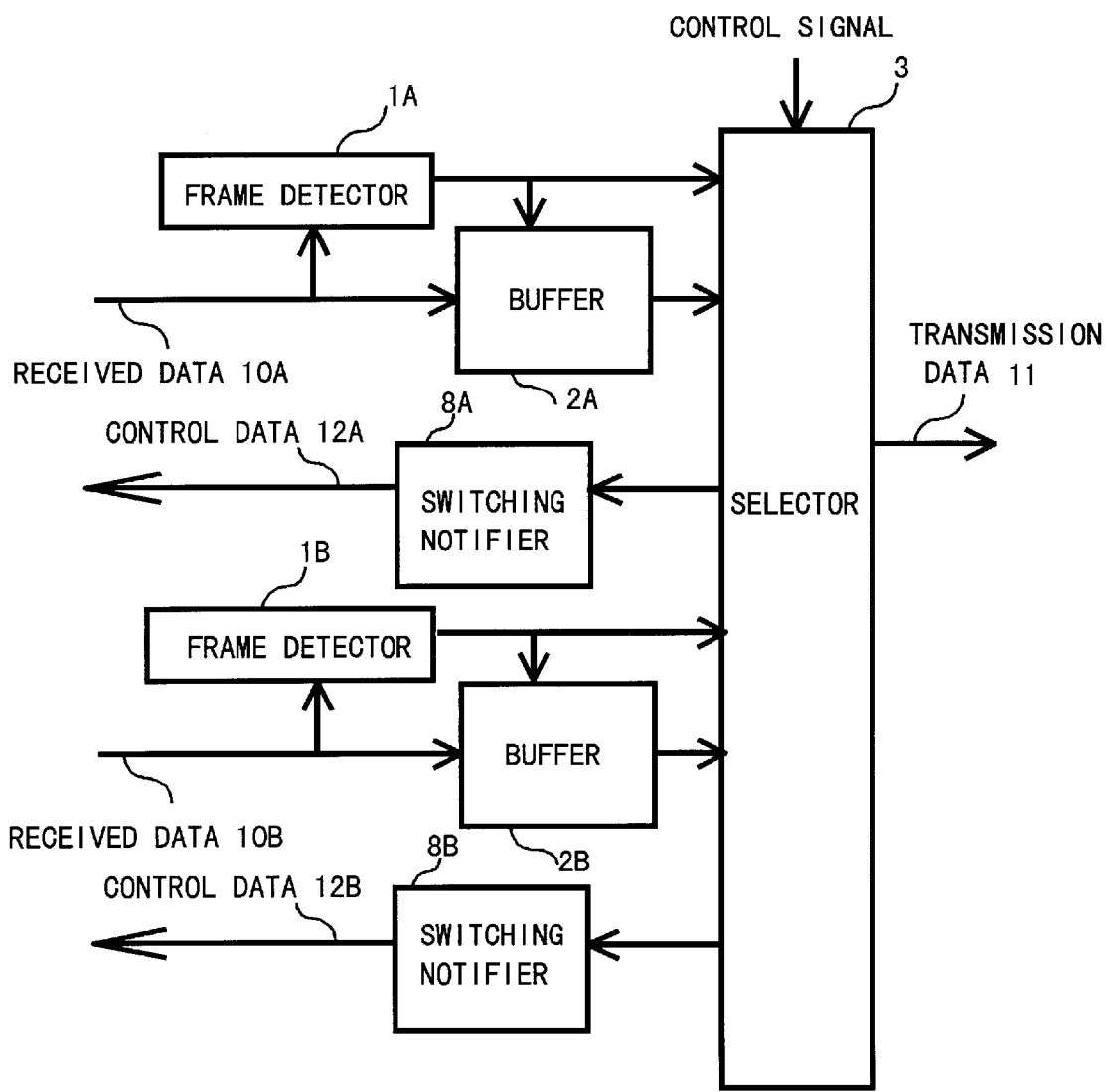
FIG. 13 shows a data switching apparatus of a tenth embodiment of the present invention.

FIG. 13 shows a data switching apparatus includes switching notifiers 8A and 8B for notifying an advance and completion notices for switching the data in addition to the data switching apparatus of the first embodiment. The switching notifiers 8A and 8B output control data 12A and 12B for notifying the advance and completion notices for switching the data. The data switching apparatus of the first embodiment does not notify transmission data sources (not shown) for the received data 10A, 10B of any information about switching the data. On the other hand, the data switching apparatus of the tenth embodiment notifies the transmission data source of the data switching timing using the control data 12A and 12B from the switching notifiers 8A and 8B.

In FIG. 13, the switching notifiers 8A and 8B generate the information for notifying transmission data sources (not shown) of the advance notice and completion of switching the data to be carried out in the selector 3. The control data 12A and 12B are used for notifying the advance notice and completion of switching the data. In FIG. 13, equivalent portions as in FIG. 1 are provided with the same reference numbers. Repeated description thereof is not necessary and is omitted. FIG. 13 has only two switching notifiers 8A and 8B, however, more than two switching notifiers may be provided.

The switching notifiers 8A and 8B and the control data 12A and 12B may be added to the data switching apparatuses of FIGS. 5, 10 and 12 in the same way as that in FIG. 13.

The operation of the data switching apparatus of the tenth embodiment is explained below.

Receiving the switching instruction from the outside, the selector 3 notifies the switching notifiers 8A and 8B of "advance notice of switching". The switching notifiers 8A and 8B notify the respective transmission sources corresponding to the received data 10A and 10B of the advance notice of switching through the control data 12A and 12B, respectively. The advance notice of switching is notified to both of the transmission source corresponding to the data before switching and the transmission source corresponding to the data after switching.

Each transmitting source (not shown) notified by the advance notice of switching through the control data 12A and 12B transmits an appropriate received data 10A and 10B for switching, respectively.

Then the selector 3 switches the received data 10A with the received data 10B. Further, the selector 3 notifies the switching notifiers 8A and 8B of "switching completion". The switching notifiers 8A and 8B notify each transmission source for the received data of the completion of switching through the control data 12A and 12B, respectively. The completion of switching is notified to both of the transmitting source corresponding to the data before switching and transmitting source corresponding to the data after switching.

Each apparatus (not shown) notified with the completion of switching through the control data 12A and 12B transmits the normal received data 10A and 10B instead of the received data 10A and 10B suitable for switching, respectively.

Accordingly, each apparatus (not shown) for transmitting the received data 10A and 10B recognizes the timing for switching the data in the data switching apparatus, then generates the coded data appropriate for switching data, and transmits them to the buffers 2A and 2B as the received data 10A and 10B, respectively.

Figure 14:
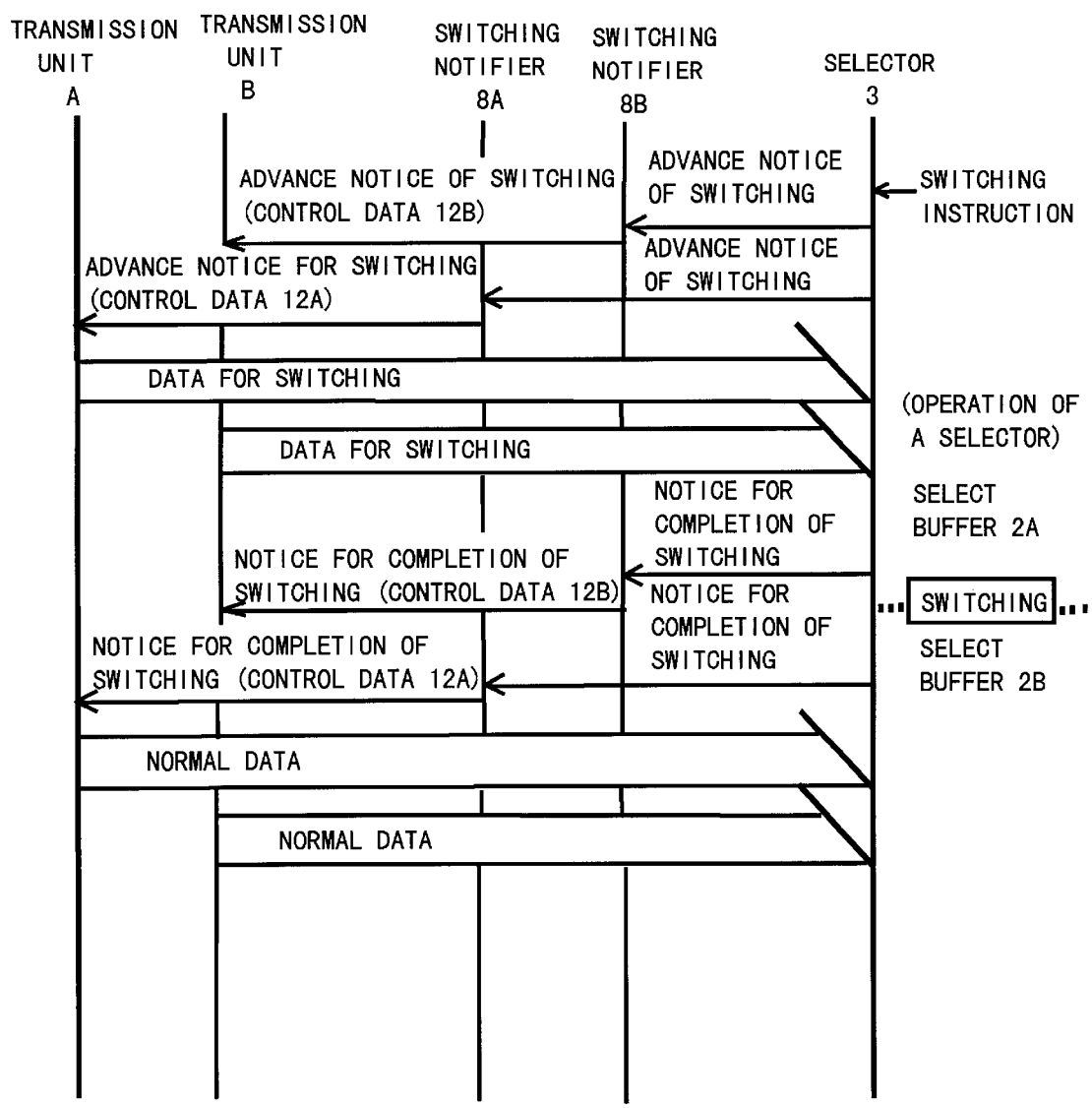
FIG. 14 is a timing chart of control signals of the data switching apparatus of the tenth embodiment of the present invention.

FIG. 14 is a timing chart of control signals among the switching notifiers 8A and 8B and the transmission apparatuses A and B (not shown) for transmitting the received data 10A and 10B and a selector 3. According to the switching instruction from the outside, the selector 3 notifies the switching notifiers 8A and 8B of "advance notice of switching", respectively. The switching notifiers 8A and 8B respectively notify the transmission apparatuses A and B for transmitting the received data 10A and 10B of "advance notice of switching" using the control data 12A and 12B. Receiving "advance notice of switching", the transmission apparatuses A and B transmit the data suitable for switching as received data 10A and 10B to the buffers 2A and 2B.

After predetermined time, the selector 3 switches the received data 10A with the received data 10B) at a point suitable for switching and notifies the switching notifiers 8A and 8B of "switching completion", respectively. The switching notifiers 8A and 8B respectively notify the transmission apparatuses A and B of "switching completion" using the control data 12A and 12B. Receiving "switching completion", the transmission apparatuses A and B transmit the normal data as the received data 10A and 10B.

Figure 15:
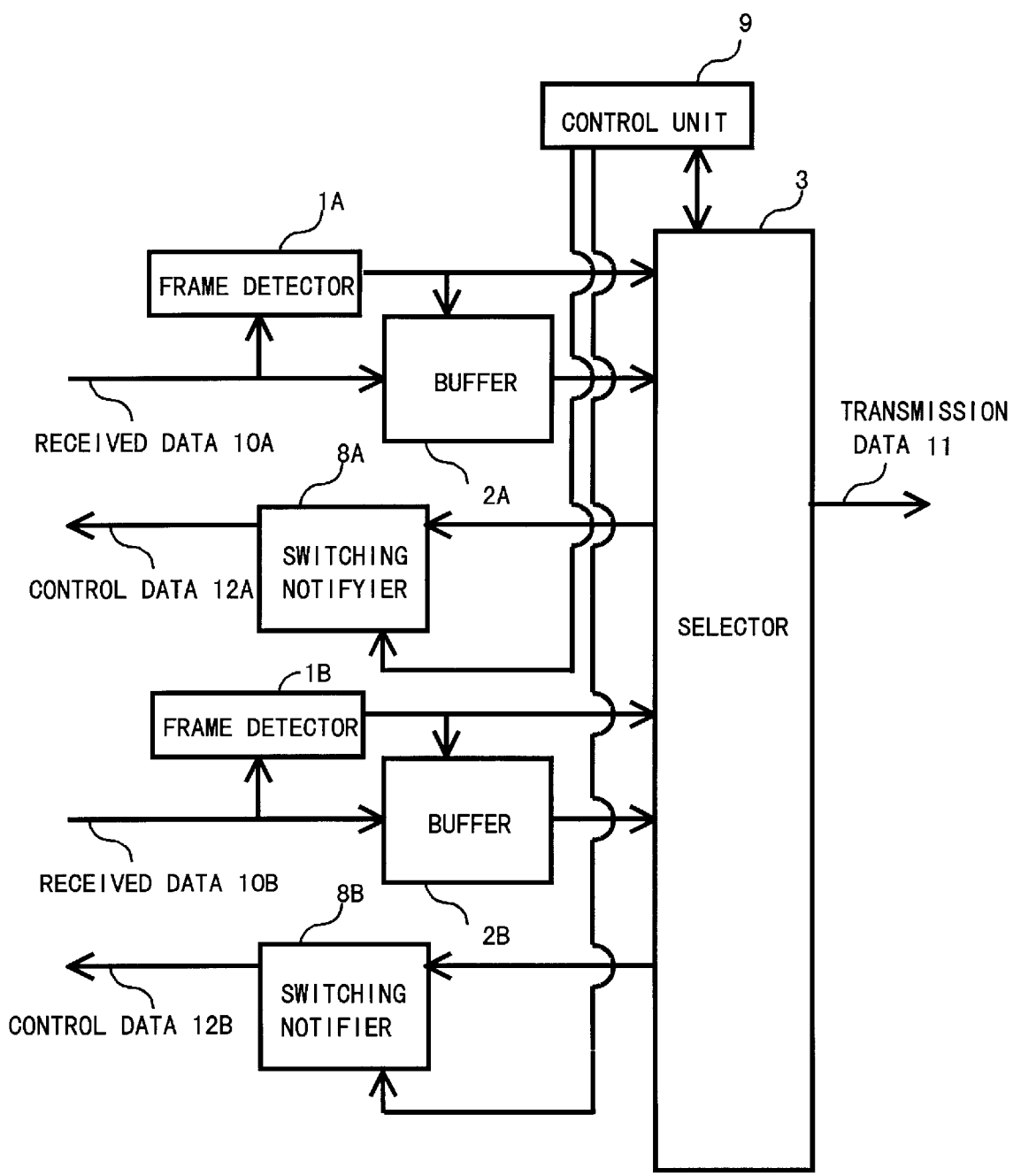
FIG. 15 shows a modified data switching apparatus of the tenth embodiment of the present invention.
Figure 16:
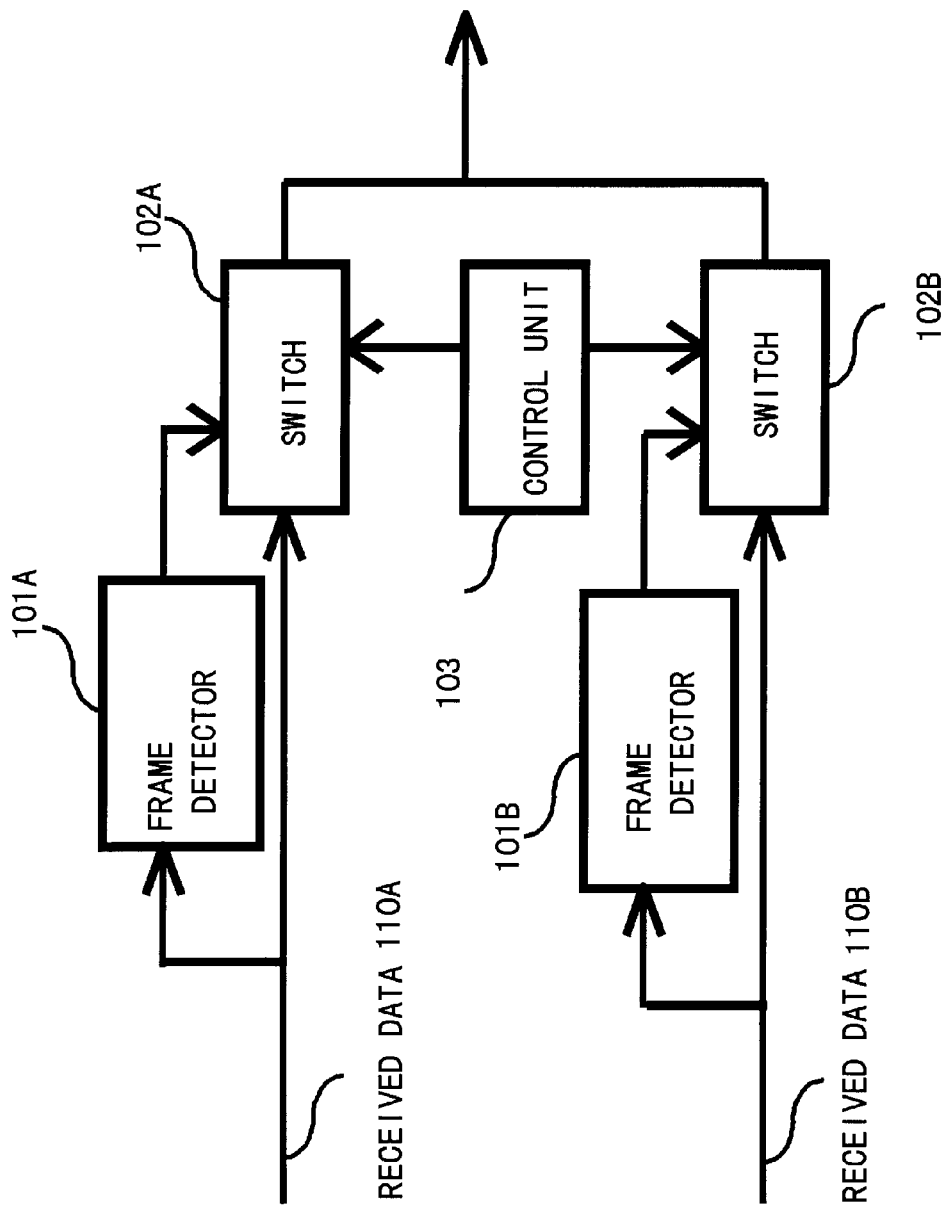
FIG. 16 shows a block diagram of a conventional data switching apparatus.

FIG. 15 shows a modification of the control system of FIG. 13. The data switching apparatus of FIG. 15 includes a control unit 9 for instructing the switching. In the data switching apparatus of FIG. 13, the switching notifiers 8A and 8B transmit the control data 12A and 12B according to the instruction from the selector 3. In the data switching apparatus of FIG. 15, however, the control unit 9 provides instruction to the switching notifiers 8A and 8B. The selector 3 is instructed by the control unit 9 and notify the control unit 9 of completion of switching after e.g. several seconds. Receiving this, the control unit 9 sends the instruction of switching completion to the switching notifiers 8A and 8B.

The forward prediction and the backward prediction are generally used for coding the data efficiently. Upon switching by the selector 3, the prediction cannot be carried out before and after the switching point. In other words, the normal switching can be carried out only at the points where no prediction is carried out. The above normal switching means that no errors are occurred during decoding. Therefore, the transmitting apparatuses for transmitting the received data 10A and 10B is necessary to perform coding suitable for the data switching when the transmitting apparatuses are notified with the advance notice of switching.

On the other hand, the coding suitable for switching has small coding efficiency because no prediction is carried out. Therefore, the data switching apparatus receives the received data 10A and 10B which can easily switch the data only when the data switching apparatus switches the data, although the coding efficiency decreases. Even when the normal coding is carried out, there may exist some switching points where no decoding errors occur. In this case, by generating frequent points available for switching, the data switching apparatus can switch the data at various points, thereby the flexibility for switching increases and switching the data becomes easier.

The apparatus for receiving the transmission data 11 (not shown) before and after switching can hold a desired VBV buffer residual quantity by making the decoding start delay time of the received video data coincident with a predetermined value. Therefore, it is possible to prevent decoding errors occurred by overflow and underflow of VBV buffer after switching.

Each transmitting apparatus (not shown) notified with the advance notice of switching through the control data 12A and 12B controls the coding so that the decoding start delay time of the video data becomes a predetermined value until the switching completion has been notified. Therefore, the apparatus for receiving the transmission data 11 can prevent the VBV buffer of the video from overflowing and underflowing after switching.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A data switching apparatus comprising:
   plural data unit detectors each for detecting a coding unit of a data from a received data;
   plural data storages each for storing the received data in a buffer and transmitting the received data at a given time from a point specified by said data unit detector; and
   a data selecting unit for selecting and transmitting only one data stream from a plurality of data streams which are transmitted respectively from said plural data storages,
   wherein each of the plural data storages comprises a delay unit which delays the received data for more than a predetermined time.

2. The data switching apparatus of claim 1, wherein said plural data storages start and terminate the data transmission at the end of the coding unit in the data detected by said data unit detector; and
   said data selecting unit switches a data stream from one of the plural data storages with a data stream from another one of the plural data storages so that each data stream from respective data storages is linked continuously.

3. The data switching apparatus of claim 1, comprising:
   a pattern generator for transmitting predetermined data to said data selecting unit upon request from said data selecting unit.

4. The data switching apparatus of claim 3, wherein said pattern generator generates and transmits invalid data, quantity of the invalid data being requested by said data selecting unit.

5. The data switching apparatus of claim 3, wherein said pattern generator generates and transmits stuff data for video data, quantity of the stuff data being requested by said data selecting unit.

6. The data switching apparatus of claim 3 further comprising:
   plural switching notifiers each for notifying a transmission data source of an advance and completion notices for switching the data in response to a request from said data selecting unit upon switching.

7. The data switching apparatus according to claim 1, wherein each of said plural data buffers receives and holds head and end points of a coding unit of said received data from said data unit detector,
   when said data buffer is selected by said data selecting unit, said data buffer transmits said received data, starting at said head point, to said data selecting unit, and
   when said data buffer is not selected by said data selecting unit, said data buffer stores said received data until said end point is reached, at which time said data buffer discards said received data.

8. The data switching apparatus according to claim 1, wherein said delay time is sufficient to compensate for delays for receiving said head and end points from said data unit detector, allowing each of said plural data storages to accurately recognize said head or end points of said received data.

9. A data switching apparatus comprising:
   plural data unit detectors each for detecting a coding unit of a data from a received data;
   plural data-storages each for storing the received data in a buffer and transmitting the received data at a given time from a point specified by said data unit detector;
   a data selecting unit for selecting and transmitting only one data stream from a plurality of data streams which are transmitted respectively from said plural data storages; and
   a pattern generator for transmitting predetermined data to said data selecting unit upon request from said data selecting unit,
   wherein said pattern generator generates and transmits unit coding video data with small information quantity, quantity of the data being requested by said data selecting unit.

10. A data switching apparatus comprising:
   plural data unit detectors each for detecting a coding unit of a data from a received data;
   plural data storages each for storing the received data in a buffer and transmitting the received data at a given time from a point specified by said data unit detector;
   a data selecting unit for selecting and transmitting only one data stream from a plurality of data streams which are transmitted respectively from said plural data storages; and
   a comparator for comparing each value of respective decoding start delay time included in two received data to be switched,
   wherein said data selecting unit inserts stuff data in the video data when the decoding start delay time before switching is larger than that after switching, and inserts unit coding video data with a small information quantity in the video data when the decoding start delay time before switching is smaller than that after switching, so that the respective decoding start delay times included in the two received data to be switched become the same.

11. A data switching apparatus comprising:
   plural data unit detectors each for detecting a coding unit of received data;
   plural data storages each for storing a received data in a buffer and transmitting the received data specified from said data unit detector at a given time from a point specified by the data unit detector; and
   a multiplexer for selecting, multiplexing and transmitting a subset of data streams from a plurality of data streams which are transmitted respectively from said plural data storages.

12. The data switching apparatus of claim 11, comprising:
   a pattern generator for transmitting a predetermined data pattern to said multiplexer upon request from said multiplexer.

13. The data switching apparatus of claim 11, wherein said plural data storages start and terminate the data transmission at the end of the coding unit in the data detected by said data unit detector, and
   said multiplexer switches between a subset of data streams to another subset of data streams from said plural data storages so that each multiplexed subset of data streams are transmitted from said multiplexer continuously.

14. The data switching apparatus of claim 13 further comprising:
   plural switching notifiers each for notifying a transmission data source of an advance and completion notices for switching the data in response to a request from said multiplexer upon switching.

15. A data switching apparatus comprising:
   plural data unit detectors each for detecting a coding unit of a data from a received data;
   plural data storages each for storing the received data in a buffer and transmitting the received data at a given time from a point specified by said data unit detector;
   a data selecting unit for selecting and transmitting only one data stream from a plurality of data streams which are transmitted respectively from said plural data storages; and
   plural switching notifiers each for notifying a transmission data source of an advance and completion notices for switching the data in response to a request from said data selecting unit upon switching,
   wherein said plural data storages start and terminate the data transmission at the end of the coding unit in the data detected by said data unit detector; and
   said data selecting unit switches a data stream from one of the plural data storages with a data stream from another one of the plural data storages so that each data stream from respective data storages is linked continuously.

16. The data switching apparatus of claim 10, wherein said switching notifier requests the transmission data source to generate breaking points for the data coding unit frequently.

17. The data switching apparatus of claim 15, wherein said switching notifier requests the transmission data source to make the decoding start delay time of the received video data coincident with a predetennined value.

18. A data switching apparatus comprising:
   a plurality of data unit detectors, each data unit detector for detecting start points of coding units within received data;
   a plurality of data storage devices, each data storage device corresponding to a data unit detection, said data storage device storing the received data in a buffer and holding said start point specified by said corresponding data unit detector upon request;

a data selecting unit for selecting and requesting data from a data storage device, and transmitting said requested data from said selected data storage device, wherein upon request, said selected data storage device transmits the most current stored data from said start point to said data selecting unit.

19. The data switching apparatus according to claim 18, wherein said data unit detectors further detect end points of coding units within said received data, said each data storage device further holds said end point detected by said corresponding data unit detector, and each data storage device not selected by said data selecting unit stores said received data until said end point is reached, at which time said received data is discarded.

20. The data switching apparatus of claim 19, wherein said head point and said end points of said coding units are the same.

21. The data switching apparatus of claim 19, wherein said data selecting unit switches said selected data storage device with another data storage device so the data transmitted from the selected data storages are linked continuously at their respective end and head points.

22. The data switching apparatus of claim 18, wherein each of the plural data storages comprises a delay unit for delaying the received data for an amount of time.

23. The data switching apparatus of claim 18, further comprising:

a pattern generator for transmitting predetermined data to said data selecting unit upon request from said data selecting unit.

24. The data switching apparatus of claim 23, wherein said pattern generator generates and transmits invalid data, the quantity of the invalid data being requested by said data selecting unit.

25. The data switching apparatus of claim 23, wherein said pattern generator generates and transmits stuff data for video data, the quantity of the stuff data being requested by said data selecting unit.

26. The data switching apparatus of claim 23, wherein said pattern generator generates and transmits unit coding video data with small information quantity, the quantity of the unit coding video data being selected by said data selecting unit.

27. The data switching apparatus according to claim 23, further comprising:

a comparator for comparing each value of respective decoding start delay time included in two received data to be switched, wherein said data selecting unit inserts stuff data in the video data when the decoding start delay time before switching is larger than that after switching, and inserts unit coding video data with a small information quantity in the video data when the decoding start delay time before switching is smaller than that after switching, so that the respective decoding start delay times included in the two received data to be switched become the same.

28. The data storage device of claim 18, wherein said data selecting unit comprises a multiplexer which selects and requests data from a subset of said plurality data storage devices, and multiplexes and transmits the data from said requested subset of data storage devices.

* * * * *